(12) United States Patent
Pietrzyk et al.

(10) Patent No.: US 8,152,053 B2
(45) Date of Patent: *Apr. 10, 2012

(54) RFID ARCHITECTURE IN AN INDUSTRIAL CONTROLLER ENVIRONMENT

(75) Inventors: Arthur P. Pietrzyk, Thompson, OH (US); Vivek R. Bapat, Pittsburgh, PA (US); Sujeet Chand, Brookfield, WI (US); Kenwood H. Hall, Hudson, OH (US); Richard A. Morse, Hudson, OH (US); Joseph P. Owen, Elm Grove, WI (US); Andreas Somogyi, Sagamore Hills, OH (US); Kenneth A. Tinnell, Loveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 474 days.

This patent is subject to a terminal disclaimer.

(21) Appl. No.: 12/403,225

(22) Filed: Mar. 12, 2009

(65) Prior Publication Data

US 2009/0206154 A1 Aug. 20, 2009

Related U.S. Application Data

(63) Continuation of application No. 11/222,256, filed on Sep. 8, 2005, now Pat. No. 7,510,110.

(51) Int. Cl.
*G06K 19/06* (2006.01)
(52) U.S. Cl. ........................ 235/375; 235/492
(58) Field of Classification Search .................. 235/492, 235/486, 487, 375, 381, 382, 382.5, 380, 235/449
See application file for complete search history.

(56) References Cited

U.S. PATENT DOCUMENTS

| | | | |
|---|---|---|---|
| 2,999,499 | A | 9/1961 | Willet |
| 3,858,212 | A | 12/1974 | Tompkins et al. |
| 4,381,903 | A | 5/1983 | Atkins |
| 4,722,372 | A | 2/1988 | Hoffman et al. |
| 4,949,299 | A | 8/1990 | Pickett et al. |

(Continued)

FOREIGN PATENT DOCUMENTS

CN 1426546 A 6/2003

(Continued)

OTHER PUBLICATIONS

CN OA due Apr. 1, 2008 for Chinese Patent Application No. 200510137387.6, 21 pages.

(Continued)

*Primary Examiner* — Thien M Le
(74) *Attorney, Agent, or Firm* — Turocy & Watson, LLP

(57) ABSTRACT

An RFID reader and/or writer module in an industrial controller (e.g., PLC). The RFID module interfaces internally to the controller for tight integration therewith. The RFID module can also be part of a controller communications framework and as a standalone module with the PLC as a master device, and interact with the RFID module in the same manner as it interacts with other I/O devices connected to the controller. In another aspect, RFID read/write tag technology is incorporated into some or all major PLC and rack components, and utilized for wireless communication both between PLC system components and between the PLC and other devices, locations, and media. The RFID tag can be used to store and exchange electronic keying data, security information, module diagnostics and warranty information, series and revision levels code, I/O configuration data, and, replacement data. Artificial intelligence is also employed.

20 Claims, 17 Drawing Sheets

U.S. PATENT DOCUMENTS

| | | | |
|---|---|---|---|
| 4,967,940 A | 11/1990 | Blette et al. |
| 5,300,875 A | 4/1994 | Tuttle |
| 5,461,666 A | 10/1995 | McMahan et al. |
| 5,494,193 A | 2/1996 | Kirschner et al. |
| 5,613,228 A | 3/1997 | Tuttle et al. |
| 5,621,199 A | 4/1997 | Calari et al. |
| 5,629,981 A | 5/1997 | Nerlikar |
| 5,689,415 A | 11/1997 | Calotychos et al. |
| 5,701,127 A | 12/1997 | Sharpe |
| 5,703,347 A | 12/1997 | Reddersen et al. |
| 5,785,181 A | 7/1998 | Quartararo, Jr. |
| 5,798,693 A | 8/1998 | Engellenner |
| 5,822,714 A | 10/1998 | Cato |
| 5,874,724 A | 2/1999 | Cato |
| 5,874,896 A | 2/1999 | Lowe et al. |
| 5,905,249 A | 5/1999 | Reddersen et al. |
| 5,910,776 A | 6/1999 | Black |
| 5,947,167 A | 9/1999 | Bogen et al. |
| 5,949,335 A | 9/1999 | Maynard |
| 5,952,935 A | 9/1999 | Mejia et al. |
| 5,963,134 A | 10/1999 | Bowers et al. |
| 5,964,656 A | 10/1999 | Lawler, Jr. et al. |
| 5,971,587 A | 10/1999 | Kato et al. |
| 5,973,600 A | 10/1999 | Mosher, Jr. |
| 5,983,200 A | 11/1999 | Slotznick |
| 5,992,096 A | 11/1999 | De La Cerda et al. |
| 6,049,745 A | 4/2000 | Douglas et al. |
| 6,091,998 A | 7/2000 | Vasko et al. |
| 6,115,616 A | 9/2000 | Halperin et al. |
| 6,116,505 A | 9/2000 | Withrow |
| 6,121,878 A | 9/2000 | Brady et al. |
| 6,144,301 A | 11/2000 | Frieden |
| 6,150,948 A | 11/2000 | Watkins |
| 6,154,790 A | 11/2000 | Pruett et al. |
| 6,169,483 B1 | 1/2001 | Ghaffari et al. |
| 6,170,059 B1 | 1/2001 | Pruett et al. |
| 6,172,609 B1 | 1/2001 | Lu et al. |
| 6,205,362 B1 | 3/2001 | Eidson |
| 6,211,789 B1 | 4/2001 | Oldham et al. |
| 6,263,440 B1 | 7/2001 | Pruett et al. |
| 6,264,106 B1 | 7/2001 | Bridgelall |
| 6,265,976 B1 | 7/2001 | Roesner et al. |
| 6,272,321 B1 | 8/2001 | Bruhnke et al. |
| 6,275,681 B1 | 8/2001 | Vega et al. |
| 6,282,407 B1 | 8/2001 | Vega et al. |
| 6,282,455 B1 | 8/2001 | Engdahl |
| 6,285,295 B1 | 9/2001 | Casden |
| 6,286,762 B1 | 9/2001 | Reynolds et al. |
| 6,286,763 B1 | 9/2001 | Reynolds et al. |
| 6,293,467 B1 | 9/2001 | Reddersen et al. |
| 6,297,734 B1 | 10/2001 | Richardson et al. |
| 6,305,548 B1 | 10/2001 | Sato et al. |
| 6,307,517 B1 | 10/2001 | Lee |
| 6,317,027 B1 | 11/2001 | Watkins |
| 6,318,636 B1 | 11/2001 | Reynolds et al. |
| 6,330,971 B1 | 12/2001 | Mabry et al. |
| 6,342,839 B1 | 1/2002 | Curkendall et al. |
| 6,353,406 B1 | 3/2002 | Lanzl et al. |
| 6,354,493 B1 | 3/2002 | Mon |
| 6,362,738 B1 | 3/2002 | Vega |
| 6,366,206 B1 | 4/2002 | Ishikawa et al. |
| 6,377,176 B1 | 4/2002 | Lee |
| 6,377,203 B1 | 4/2002 | Doany |
| 6,377,764 B1 | 4/2002 | Morris-jones |
| 6,392,544 B1 | 5/2002 | Collins et al. |
| 6,400,272 B1 | 6/2002 | Holtzman |
| 6,400,372 B1 | 6/2002 | Gossweiler, III et al. |
| 6,401,936 B1 | 6/2002 | Isaacs |
| 6,409,401 B1 | 6/2002 | Petteruti et al. |
| 6,415,978 B1 | 7/2002 | McAllister |
| 6,429,776 B1 | 8/2002 | Alicot et al. |
| 6,445,297 B1 | 9/2002 | Nicholson |
| 6,445,969 B1 | 9/2002 | Kenney |
| 6,448,886 B2 | 9/2002 | Garber et al. |
| 6,451,154 B1 | 9/2002 | Grabau |
| 6,476,708 B1 | 11/2002 | Johnson |
| 6,480,100 B1 | 11/2002 | Frieden et al. |
| 6,484,886 B1 | 11/2002 | Isaacs |
| 6,486,780 B1 | 11/2002 | Garber et al. |
| 6,501,382 B1 | 12/2002 | Rehfus |
| 6,505,780 B1 | 1/2003 | Yassin et al. |
| 6,517,000 B1 | 2/2003 | McAllister et al. |
| 6,523,752 B2 | 2/2003 | Nishitani et al. |
| 6,529,880 B1 | 3/2003 | McKeen et al. |
| 6,547,040 B2 | 4/2003 | Goodwin, III |
| 6,549,064 B2 | 4/2003 | Bandy et al. |
| 6,554,187 B2 | 4/2003 | Otto |
| 6,563,425 B2 | 5/2003 | Nicholson et al. |
| 6,566,997 B1 | 5/2003 | Bradin |
| 6,585,165 B1 | 7/2003 | Kuroda |
| 6,587,856 B1 | 7/2003 | Srinivasan et al. |
| 6,593,853 B1 | 7/2003 | Barrett et al. |
| 6,600,418 B2 | 7/2003 | Francis et al. |
| 6,607,123 B1 | 8/2003 | Jollifee et al. |
| 6,608,551 B1 | 8/2003 | Anderson et al. |
| 6,608,561 B2 | 8/2003 | Lawler, Jr. et al. |
| 6,612,495 B2 | 9/2003 | Reddersen et al. |
| 6,617,962 B1 | 9/2003 | Horwitz et al. |
| 6,621,417 B2 | 9/2003 | Duncan et al. |
| 6,622,567 B1 | 9/2003 | Hamel et al. |
| 6,641,042 B1 | 11/2003 | Pierenkemper et al. |
| 6,650,227 B1 | 11/2003 | Bradin |
| 6,664,897 B2 | 12/2003 | Pape et al. |
| 6,669,089 B2 | 12/2003 | Cybulski et al. |
| 6,672,512 B2 | 1/2004 | Bridgelall |
| 6,677,852 B1 | 1/2004 | Landt |
| 6,685,059 B2 | 2/2004 | Jones et al. |
| 6,687,293 B1 | 2/2004 | Loyer et al. |
| 6,693,539 B2 | 2/2004 | Bowers et al. |
| 6,700,533 B1 | 3/2004 | Werb et al. |
| 6,700,931 B1 | 3/2004 | Lee et al. |
| 6,707,376 B1 | 3/2004 | Patterson et al. |
| 6,712,276 B1 | 3/2004 | Abali et al. |
| 6,714,121 B1 | 3/2004 | Moore |
| 6,724,308 B2 | 4/2004 | Nicholson |
| 6,726,099 B2 | 4/2004 | Becker et al. |
| 6,745,008 B1 | 6/2004 | Carrender et al. |
| 6,747,560 B2 | 6/2004 | Stevens, III |
| 6,750,769 B1 | 6/2004 | Smith |
| 6,752,277 B1 | 6/2004 | Sempliner |
| 6,784,789 B2 | 8/2004 | Eroglu et al. |
| 6,784,813 B2 | 8/2004 | Shanks et al. |
| 6,791,603 B2 | 9/2004 | Lazo et al. |
| 6,793,127 B2 | 9/2004 | Alsafadi et al. |
| 6,802,659 B2 | 10/2004 | Cremon et al. |
| 6,808,116 B1 | 10/2004 | Eslambolchi |
| 6,809,646 B1 | 10/2004 | Lee |
| 6,812,824 B1 | 11/2004 | Goldinger et al. |
| 6,812,838 B1 | 11/2004 | Maloney |
| 6,812,841 B2 | 11/2004 | Heinrich et al. |
| 6,816,817 B1 | 11/2004 | Retlich |
| 6,828,902 B2 | 12/2004 | Casden |
| 6,842,106 B2 | 1/2005 | Hughes et al. |
| 6,847,856 B1 | 1/2005 | Bohannon |
| 6,853,294 B1 | 2/2005 | Ramamurthy et al. |
| 6,853,303 B2 | 2/2005 | Chen et al. |
| 6,859,757 B2 | 2/2005 | Muehl et al. |
| 6,870,797 B2 | 3/2005 | Reasoner et al. |
| 6,873,260 B2 | 3/2005 | Lancos et al. |
| 6,878,896 B2 | 4/2005 | Braginsky et al. |
| 6,879,809 B1 | 4/2005 | Vega et al. |
| 6,888,459 B2 | 5/2005 | Stilp |
| 6,897,763 B2 | 5/2005 | Schulmerich et al. |
| 6,899,476 B1 | 5/2005 | Barrus et al. |
| 6,901,304 B2 | 5/2005 | Swan et al. |
| 6,903,656 B1 | 6/2005 | Lee |
| 6,917,291 B2 | 7/2005 | Allen |
| 6,918,541 B2 | 7/2005 | Knowles et al. |
| 6,929,412 B1 | 8/2005 | Barrus et al. |
| 6,935,560 B2 | 8/2005 | Andreasson et al. |
| 6,940,408 B2 | 9/2005 | Ferguson et al. |
| 6,943,678 B2 | 9/2005 | Muirhead |
| 6,943,688 B2 | 9/2005 | Chung et al. |
| 6,945,721 B2 | 9/2005 | Sato |
| 6,967,579 B1 | 11/2005 | Elizondo |
| 6,975,229 B2 | 12/2005 | Carrender et al. |
| 6,992,574 B2 | 1/2006 | Aupperle et al. |

| | | |
|---|---|---|
| 6,999,955 B1 | 2/2006 | Horvitz |
| 7,023,342 B2 | 4/2006 | Corbett et al. |
| 7,036,729 B2 | 5/2006 | Chung |
| 7,057,509 B2 | 6/2006 | Gualdi et al. |
| 7,061,379 B2 | 6/2006 | Chen et al. |
| 7,066,388 B2 | 6/2006 | He |
| 7,066,667 B2 | 6/2006 | Chapman et al. |
| 7,069,100 B2 | 6/2006 | Monette et al. |
| 7,073,712 B2 | 7/2006 | Jusas et al. |
| 7,075,412 B1 | 7/2006 | Reynolds et al. |
| 7,079,023 B2 | 7/2006 | Haller |
| 7,084,769 B2 | 8/2006 | Bauer et al. |
| 7,091,861 B2 | 8/2006 | Schmidtberg et al. |
| 7,114,655 B2 | 10/2006 | Chapman et al. |
| 7,127,507 B1 | 10/2006 | Clark et al. |
| 7,135,976 B2 | 11/2006 | Neff et al. |
| 7,151,456 B2 | 12/2006 | Godfrey |
| 7,165,722 B2 | 1/2007 | Shafer et al. |
| 7,183,922 B2 | 2/2007 | Mendolia et al. |
| 7,187,288 B2 | 3/2007 | Mendolia et al. |
| 7,194,072 B2 | 3/2007 | Gamble |
| 7,195,159 B2 | 3/2007 | Sloan et al. |
| 7,197,279 B2 | 3/2007 | Bellantoni |
| 7,212,637 B2 | 5/2007 | Salisbury |
| 7,221,258 B2 | 5/2007 | Lane et al. |
| 7,230,730 B2 | 6/2007 | Owen et al. |
| 7,240,027 B2 | 7/2007 | McConnell et al. |
| 7,272,502 B2 | 9/2007 | Lee et al. |
| 7,292,963 B2 | 11/2007 | Bornhoevd et al. |
| 7,317,394 B2 | 1/2008 | Koh et al. |
| 7,336,153 B2 | 2/2008 | Malone et al. |
| 7,336,167 B2 | 2/2008 | Olsen, III et al. |
| 7,336,243 B2 | 2/2008 | Jo et al. |
| 7,339,476 B2 | 3/2008 | Macurek et al. |
| 7,345,576 B2 | 3/2008 | Allen et al. |
| 7,373,087 B2 | 5/2008 | Shi et al. |
| 7,388,491 B2 | 6/2008 | Chand et al. |
| 7,389,921 B2 | 6/2008 | Lin et al. |
| 7,413,123 B2 * | 8/2008 | Ortenzi ............... 235/385 |
| 7,486,181 B2 | 2/2009 | Olsen et al. |
| 7,494,062 B2 * | 2/2009 | Holz et al. ............ 235/435 |
| 7,510,110 B2 * | 3/2009 | Pietrzyk et al. ....... 235/375 |
| 7,520,429 B2 | 4/2009 | Koster |
| 7,551,081 B2 | 6/2009 | Vrba et al. |
| 7,588,189 B2 * | 9/2009 | Fago et al. ............. 235/462.46 |
| 7,616,117 B2 | 11/2009 | Streeb et al. |
| 7,720,438 B2 | 5/2010 | Rowse |
| 7,764,191 B2 | 7/2010 | Hall et al. |
| 7,845,553 B2 * | 12/2010 | Holz et al. ............. 235/379 |
| 2001/0000019 A1 | 3/2001 | Bowers et al. |
| 2001/0008390 A1 | 7/2001 | Berquist |
| 2001/0015760 A1 | 8/2001 | Fellegara et al. |
| 2002/0005774 A1 | 1/2002 | Rudolph |
| 2002/0030597 A1 | 3/2002 | Muirhead |
| 2002/0067265 A1 | 6/2002 | Rudolph |
| 2002/0070862 A1 | 6/2002 | Francis et al. |
| 2002/0130778 A1 | 9/2002 | Nicholson |
| 2002/0143320 A1 | 10/2002 | Levin |
| 2002/0155843 A1 | 10/2002 | Bahl et al. |
| 2002/0165758 A1 | 11/2002 | Hind et al. |
| 2002/0167397 A1 | 11/2002 | Eroglu et al. |
| 2002/0185532 A1 | 12/2002 | Berquist et al. |
| 2003/0007473 A1 | 1/2003 | Strong et al. |
| 2003/0023337 A1 | 1/2003 | Godfrey et al. |
| 2003/0071731 A1 | 4/2003 | Jesme |
| 2003/0102367 A1 | 6/2003 | Monette et al. |
| 2003/0109951 A1 | 6/2003 | Hsiung et al. |
| 2003/0126103 A1 | 7/2003 | Chen et al. |
| 2003/0150908 A1 | 8/2003 | Pokorny et al. |
| 2003/0169149 A1 | 9/2003 | Ohki et al. |
| 2003/0203730 A1 | 10/2003 | Wan et al. |
| 2003/0210142 A1 | 11/2003 | Freathy et al. |
| 2003/0216969 A1 | 11/2003 | Bauer et al. |
| 2003/0225635 A1 | 12/2003 | Renz et al. |
| 2004/0008123 A1 | 1/2004 | Carrender et al. |
| 2004/0024570 A1 | 2/2004 | Muehl et al. |
| 2004/0024644 A1 | 2/2004 | Gui et al. |
| 2004/0032443 A1 | 2/2004 | Moylan |
| 2004/0046642 A1 | 3/2004 | Becker et al. |
| 2004/0061324 A1 | 4/2004 | Howard |
| 2004/0062294 A1 | 4/2004 | Clemens et al. |
| 2004/0066281 A1 | 4/2004 | Hughes et al. |
| 2004/0069851 A1 | 4/2004 | Grunes |
| 2004/0084526 A1 | 5/2004 | Knowles et al. |
| 2004/0095910 A1 | 5/2004 | Metts et al. |
| 2004/0108378 A1 | 6/2004 | Gatz |
| 2004/0124988 A1 | 7/2004 | Leonard et al. |
| 2004/0160324 A1 | 8/2004 | Stilp |
| 2004/0181467 A1 | 9/2004 | Raiyani et al. |
| 2004/0189443 A1 | 9/2004 | Eastburn |
| 2004/0220860 A1 | 11/2004 | Persky et al. |
| 2004/0252025 A1 | 12/2004 | Silverbrook et al. |
| 2005/0012613 A1 | 1/2005 | Eckstein et al. |
| 2005/0021369 A1 | 1/2005 | Cohen et al. |
| 2005/0028417 A1 | 2/2005 | Kim |
| 2005/0035849 A1 | 2/2005 | Yizhack |
| 2005/0040934 A1 | 2/2005 | Shanton |
| 2005/0052283 A1 | 3/2005 | Collins et al. |
| 2005/0058483 A1 | 3/2005 | Chapman et al. |
| 2005/0062603 A1 | 3/2005 | Fuerst et al. |
| 2005/0065724 A1 | 3/2005 | Lee et al. |
| 2005/0068179 A1 | 3/2005 | Roesner |
| 2005/0083180 A1 | 4/2005 | Horwitz |
| 2005/0088299 A1 | 4/2005 | Bandy et al. |
| 2005/0092825 A1 | 5/2005 | Cox et al. |
| 2005/0093678 A1 | 5/2005 | Forster et al. |
| 2005/0093703 A1 | 5/2005 | Twitchell |
| 2005/0099268 A1 | 5/2005 | Juels et al. |
| 2005/0110641 A1 | 5/2005 | Mendolia et al. |
| 2005/0135181 A1 | 6/2005 | Shionoiri et al. |
| 2005/0140511 A1 | 6/2005 | Bonnell et al. |
| 2005/0143026 A1 | 6/2005 | Bellantoni |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0177466 A1 | 8/2005 | Willins |
| 2005/0179521 A1 | 8/2005 | Pillai et al. |
| 2005/0180566 A1 | 8/2005 | Ryal |
| 2005/0188095 A1 | 8/2005 | Gardiner et al. |
| 2005/0190098 A1 | 9/2005 | Bridgelall et al. |
| 2005/0192727 A1 | 9/2005 | Shostak et al. |
| 2005/0197775 A1 | 9/2005 | Smith |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0219039 A1 | 10/2005 | Allen |
| 2005/0228528 A1 | 10/2005 | Farchmin et al. |
| 2005/0231367 A1 | 10/2005 | Bellantoni |
| 2005/0237162 A1 | 10/2005 | Hyde et al. |
| 2005/0240305 A1 | 10/2005 | Bogash et al. |
| 2005/0241548 A1 | 11/2005 | Muirhead |
| 2005/0253717 A1 | 11/2005 | Howarth et al. |
| 2005/0253718 A1 | 11/2005 | Droms et al. |
| 2005/0258955 A1 | 11/2005 | Gloekler et al. |
| 2005/0264401 A1 | 12/2005 | Haller et al. |
| 2005/0269407 A1 | 12/2005 | Harmon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0049250 A1 | 3/2006 | Sullivan |
| 2006/0053234 A1 | 3/2006 | Kumar et al. |
| 2006/0055508 A1 | 3/2006 | Kumar et al. |
| 2006/0060657 A1 | 3/2006 | Choong et al. |
| 2006/0071774 A1 | 4/2006 | Brown et al. |
| 2006/0097873 A1 | 5/2006 | Vrba et al. |
| 2006/0108411 A1 | 5/2006 | Macurek et al. |
| 2006/0125653 A1 | 6/2006 | McQuade |
| 2006/0125694 A1 | 6/2006 | Dejanovic et al. |
| 2006/0145850 A1 | 7/2006 | Krstulich |

| | | | |
|---|---|---|---|
| 2006/0161878 | A1 | 7/2006 | Koh et al. |
| 2006/0170565 | A1 | 8/2006 | Husak et al. |
| 2006/0200256 | A1 | 9/2006 | Mason et al. |
| 2006/0208859 | A1 | 9/2006 | Hougen et al. |
| 2006/0229113 | A1 | 10/2006 | Rowse |
| 2006/0232382 | A1 | 10/2006 | Bauer et al. |
| 2006/0250248 | A1 | 11/2006 | Tu et al. |
| 2006/0279412 | A1 | 12/2006 | Holland et al. |
| 2007/0008073 | A1 | 1/2007 | Poasevara |
| 2007/0013517 | A1 | 1/2007 | Posamentier |
| 2007/0013519 | A1 | 1/2007 | Chung et al. |
| 2007/0018820 | A1 | 1/2007 | Chand et al. |
| 2007/0035396 | A1 | 2/2007 | Chand et al. |
| 2007/0040681 | A1 | 2/2007 | Jessup |
| 2007/0055470 | A1 | 3/2007 | Pietrzyk et al. |
| 2007/0063029 | A1 | 3/2007 | Brandt et al. |
| 2007/0075128 | A1 | 4/2007 | Hall et al. |
| 2007/0075832 | A1 | 4/2007 | Morse et al. |
| 2007/0137531 | A1 | 6/2007 | Muirhead |
| 2007/0159311 | A1 | 7/2007 | Schober |
| 2007/0159331 | A1 | 7/2007 | Zegelin |
| 2007/0205860 | A1 | 9/2007 | Jones et al. |
| 2007/0205861 | A1 | 9/2007 | Nair et al. |
| 2008/0118378 | A1 | 5/2008 | Baron et al. |
| 2008/0278328 | A1 | 11/2008 | Chand et al. |
| 2009/0243808 | A1 | 10/2009 | Vrba et al. |
| 2009/0254199 | A1 | 10/2009 | Vrba et al. |

FOREIGN PATENT DOCUMENTS

| | | |
|---|---|---|
| CN | 1801714 A | 7/2006 |
| CN | 1952950 A | 4/2007 |
| CN | 101300609 A | 11/2008 |
| CN | 101356543 A | 1/2009 |
| CN | 100512117 C | 7/2009 |
| DE | 10314260 A1 | 10/2004 |
| EP | 1542105 A | 6/2005 |
| EP | 1 557 806 A2 | 7/2005 |
| EP | 1557806 A2 | 7/2005 |
| EP | 1 657 609 A1 | 11/2005 |
| EP | 1 657 606 A1 | 5/2006 |
| EP | 1 750 185 A2 | 2/2007 |
| EP | 1 752 908 A2 | 2/2007 |
| EP | 1 772 812 A2 | 4/2007 |
| EP | 1 657 609 B1 | 3/2010 |
| JP | 06-119501 | 4/1994 |
| JP | 2001-126038 | 5/2001 |
| JP | 2003-195914 | 7/2003 |
| JP | 2004-078656 | 3/2004 |
| JP | 2005-157806 | 6/2005 |
| JP | 2005-174099 | 6/2005 |
| JP | 2005-176713 | 7/2005 |
| JP | 2005-196235 | 7/2005 |
| WO | 0016289 | 3/2000 |
| WO | 0058752 | 10/2000 |
| WO | WO00/65551 | 11/2000 |
| WO | 0169516 | 9/2001 |
| WO | 01/82009 A2 | 11/2001 |
| WO | 02073523 | 9/2002 |
| WO | 02/101670 A2 | 12/2002 |
| WO | 03056403 A | 7/2003 |
| WO | 03056469 A | 7/2003 |
| WO | 20041040387 A | 5/2004 |
| WO | 2005045743 A | 5/2005 |
| WO | 2005098737 A2 | 10/2005 |
| WO | 2007 021648 A2 | 2/2007 |
| WO | 2007/030544 A2 | 3/2007 |
| WO | 2007/030544 A3 | 3/2007 |
| WO | 20071030394 A | 3/2007 |
| WO | 2008063553 A2 | 5/2008 |

OTHER PUBLICATIONS

OA dated Jan. 7, 2010 for U.S. Appl. No. 12/040,305, 78 pages.
European Search Report dated Nov. 20, 2009 for European Patent Application No. EP 06 80 3042, 7 pages.
OA dated Dec. 24, 2009 for U.S. Appl. No. 12/140,118, 76 pages.
OA dated Jan. 27, 2010 for U.S. Appl. No. 11/185,114, 88 pages.
OA dated Jan. 13, 2010 for U.S. Appl. No. 12/263,750, 16 pages.
OA dated Oct. 8, 2009 for U.S. Appl. No. 11/200,915, 41 pages.
Final OA mailed Mar. 1, 2010 for U.S. Appl. No. 11/239,959, 29 pages.
European Search Report dated Feb. 6, 2006 mailed Feb. 20, 2006 for European Patent Application U.S. Appl. No. 10/985,173, 3 Pages.
European Search Report dated Feb. 14, 2006 mailed Feb. 20, 2006 for European Patent Application U.S. Appl. No. 10/985,621, 3 Pages.
OA Dated Aug. 8, 2008 for U.S. Appl. No. 11/241,421, 49 pages.
OA Dated Aug. 28, 2008 for U.S. Appl. No. 11/129,199, 28 pages.
OA Dated May 30, 2008 for U.S. Appl. No. 11/222,256, 60 pages.
OA Dated Apr. 28, 2008 for U.S. Appl. No. 11/220,130, 29 pages.
OA Dated Apr. 30, 2008 for U.S. Appl. No. 11/185,114, 80 pages.
International Search Report for PCT Application Serial No. PCT/US06/34290, mailed Feb. 5, 2008, 2 pages.
International Search Report for International Patent Application Serial No. PCT/EP2005/007878, mailed May 17, 2006, 8 pages.
M. Karkkainen, et al. "The product centric approach: a solution to supply network information management problems?" Computers in Industry, Elsevier Science Publishers. Amsterdam, NL, vol. 52, No. 2, Oct. 2003.
Partial International Search Report dated Mar. 30, 2006, for PCT Application Serial No. PCT/EP2005/007878, 3 pages.
OA Dated Jan. 30, 2009 for U.S. Appl. No. 11/129,199, 32 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Sep. 18, 2008 for U.S. Appl. No. 11/190,143, 22 pages.
OA Dated Mar. 26, 2009 for U.S. Appl. No. 11/200,915, 70 pages.
OA Dated Sep. 30, 2008 for U.S. Appl. No. 11/230,758, 63 pages.
OA Dated Feb. 6, 2009 for U.S. Appl. No. 11/241,421, 14 pages.
OA Dated Oct. 2, 2008 for U.S. Appl. No. 11/185,114, 42 pages.
International Search Report for PCT Application Serial No. PCT/US06/34721 mailed Apr. 26, 2007, 1 page.
OA Dated Apr. 16, 2009 for U.S. Appl. No. 11/230,758, 26 pages.
OA Dated Apr. 21, 2009 for U.S. Appl. No. 11/190,143, 19 pages.
OA dated Apr. 15, 2010 for U.S. Appl. No. 11/241,421, 23 pages.
OA dated Mar. 1, 2010 for U.S. Appl. No. 11/239,959, 29 pages.
Notice of Allowance dated Apr. 1, 2011 for U.S. Appl. No. 12/481,965, 81 pages.
CN OA Dispatched Jul. 4, 2008 for Chinese Application No. 200610141407.1, 12 pages.
EPOA dated Mar. 19, 2009 for European Patent Application No. 05 776 159.5, 3 pages.
EPOA dated Aug. 20, 2008 for European Patent Application No. 05 776 159.5, 3 pages.
International Search Report dated May 17, 2006 for PCT Application No. PCT/EP2005/007878, 8 pages.
OA dated Jun. 4, 2009 for U.S. Appl. No. 11/185,114, 95 pages.
OA dated May 14, 2009 for U.S. Appl. No. 11/239,959, 37 pages.
OA dated Jun. 23, 2010 for U.S. Appl. No. 12/040,305, 30 pages.
OA dated Jun. 18, 2010 for U.S. Appl. No. 12/140,118, 13 pages.
OA Dated Jul. 8, 2010 for U.S. Appl. No. 11/200,915, 52 pages.
International Search Report mailed Jun. 5, 2008 for PCT Application No. PCT/US2007/024049, 1 page.
European Search Report dated Jun. 9, 2008 for European Patent Application No. EP 06 02 0479, 2 pages.
International Search Report mailed Mar. 14, 2007 for PCT Application No. PCT/US2006/030751, 2 pages.
Partial European Search Report dated Nov. 3, 2008 for European Patent Application No. EP 06 01 5620, 5 pages.
CN OA dated Aug. 13, 2010 for Chinese Application No. 200680029337.9, 7 pages.
OA dated Aug. 21, 2009 for U.S. Appl. No. 11/239,959, 34 pages.
OA dated Jul. 28, 2009 for U.S. Appl. No. 11/220,130, 32 pages.
OA dated Jul. 30, 2009 for U.S. Appl. No. 12/263,750, 65 pages.
OA Dated Aug. 26, 2009 for U.S. Appl. No. 11/241,421, 24 pages.
OA Dated Sep. 21, 2009 for U.S. Appl. No. 11/190,143, 27 pages.

OA dated Oct. 27, 2009 for U.S. Appl. No. 11/230,758, 39 pages.
OA dated Oct. 25, 2010 for U.S. Appl. No. 12/040,305, 23 pages.
OA dated Dec. 22, 2010 for U.S. Appl. No. 11/200,915 27 pages.
Non-Final Office Action dated Oct. 17, 2011 for U.S. Appl. No. 11/200,915, 43 pages.

JP OA, mailed Nov. 29, 2011, for Japanese Patent Application No. 2008-526111, 8 pages (English Translation).

* cited by examiner

RFID ARCHITECTURE IN AN INDUSTRIAL CONTROLLER ENVIRONMENT

RELATED APPLICATIONS

This application is a continuation of U.S. patent application Ser. No. 11/222,256, filed Sep. 8, 2005 and entitled "RFID ARCHITECTURE IN AN INDUSTRIAL CONTROLLER ENVIRONMENT," the entirety of which is incorporated herein by reference.

TECHNICAL FIELD

This invention is related to programmable logic controllers, and the implementation therein of RFID technology.

BACKGROUND OF THE INVENTION

In today's highly sophisticated, complex and intelligent automation systems, industrial controllers have powerful tools and features that could be simplified through the use of RFID (radio frequency identification). When implementing an RFID solution in a distribution center or a factory, it is customary to utilize three distinct platforms: an RFID reader/antenna, RFID "middleware" running on a standard PC (personal computer), and a PLC (programmable logic controller). Each platform requires its own configuration and management resulting in higher costs in implementation and support (e.g., by wiring and labor for three platforms, different environments, and operator training). Moreover, the reader and PC may not be ruggedized for an industrial environment.

The traditional approach is to have an RFID reader connection to the PLC via a network using, for example, RS-232 serial communications, Ethernet, or any of the field buses such as DeviceNet, ControlNet, etc. Using such technologies typically involves the use of interface cards and/or logic that requires software control, power needs, and additional hardware maintenance. Moreover, in that there are other communications links involved, it is possible to have missed packets, in addition to the implementation of slower communications speeds due to these links or network dependencies. The interface between an RFID reader and a PLC must be both fast and reliable. The speed determines the rate at which RFID tags can be read and the reliability of this interface determines the usability of the RFID information. By using shorter communications pathways and such pathways that can be dedicated, it is possible to achieve higher bandwidth communications. Accordingly, there is an unmet need in the art for an improved RFID system in the automation regime.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The disclosed architecture, in one aspect thereof is architecture that can use radio frequency identification (RFID) as a wireless means for capturing, storing and sending information and control parameters. All of the captured information can be made available via an RFID reader device that scans the system and its components reading the tags from modules, racks, power supplies, processors, and so on. This information can include configuration data, series/revision information, and diagnostics data, for example. Once scanned and recorded, the entire system configuration and status can be transmitted to a remote support site for duplication in order to perform evaluations such as diagnostics, warranty, and troubleshooting.

Additionally, using RFID to store internal information, data, and code can improve maintenance, reduce errors and downtime when modules are replaced, and can be used as a major game changer/differentiator, since many of the manual interactions could be automated with "smarter" PLC (programmable logic controller) components that automatically communicate with each other without additional external wires, HMI (Human Machine Interface), etc.

Accordingly, the invention disclosed and claimed herein, in one aspect thereof, comprises implementation of an RFID reader (or reader module) into a controller (e.g., a PLC). This module contains an RF (radio frequency) interface, logic, and processor to function as an RFID reader, but instead of residing external to the controller and as a node on a network, the reader resides internal to the controller and interfaces to an internal communications framework of the PLC (e.g., a controller backplane). Use of the internal communications framework of the controller facilitates faster, more reliable communications between the controller and the reader, and reduces or eliminates missed packets that can normally occur over a loaded packet-based network. Such packet-based communications can include CIP (Common Industrial Protocol), which is an open protocol to allow direct communication with a controller, or a middleware software module.

When internalized to the controller, the RFID reader module can connect to an RFID reader antenna via an RF coaxial cable. The antenna can be a traditional RFID reader antenna. This invention can accommodate all types of RFID readers from Low Frequency to High Frequency, Ultra High Frequency, and standard RFID tags to 2.4 GHz tags, for example, and finds applications at least with Logix™, SLC (Small Logic Controller) and other PLC architectures.

In another aspect of the subject invention the RFID reader is mounted internal to the controller and interface directly to a packet-based network from inside the PLC for tight integration with the PLC. For example, the RFID reader interface to the network can include support for CIP. RFID tag data can be packaged into an application-level protocol (e.g., CIP), and transmitted over the network to the controller. Additionally, a controller can now act as the "master" node on the network and interact with the RFID reader (a node) in the same manner as it interacts with other input and output (I/O) devices connected to the controller.

In yet another aspect thereof, not only is the RFID reader integrated into the controller, but also the middleware software can be directly integrated into the PLC for direct interface to the network or indirectly via the PLC. This provides a single hardware and software environment (and lowest cost solution) to the user. This solution is designed for reliable operation in an industrial environment, and finds application where RFID tags can also be utilized to send diagnostics data along with the tag data. The diagnostics data can be collected by the tag due to the presence of one or more sensors with the tag, for example.

In still another aspect of the invention, multiple RFID readers can be integrated with the controller (e.g., PLC). Currently, filtering across the multiple RFID readers is difficult and requires significant implementation effort. The controller implementation of the subject invention can utilize signal strengths from individual readers to determine who may "own" a tag. Additionally, in many systems, RFID is being used in concert with bar codes. Since bar code readers can be integrated with the controller, the controller can now coordinate the bar code reads with the RFID reads.

In another aspect, read/write tag technology can be incorporated into all major PLC components and utilized for wireless communication both between PLC system components and between the PLC and other devices, locations, and media. The use of RFID to store and exchange information includes the following uses: electronic keying such that agreement between RFID in a rack and on modules can be checked; security information that is based and stored at the physical device level (e.g., a processor could be at a different level than the I/O); module diagnostics and warranty information can be read from the module without the current requirement to program logic to monitor diagnostic bits; series and revision levels code be read and verified; a rack-based tag can store the I/O configuration so that a replacement module can easily be inserted and powered up sooner; and, a smart module would know it is a valid replacement and could automatically read its configuration and set up.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
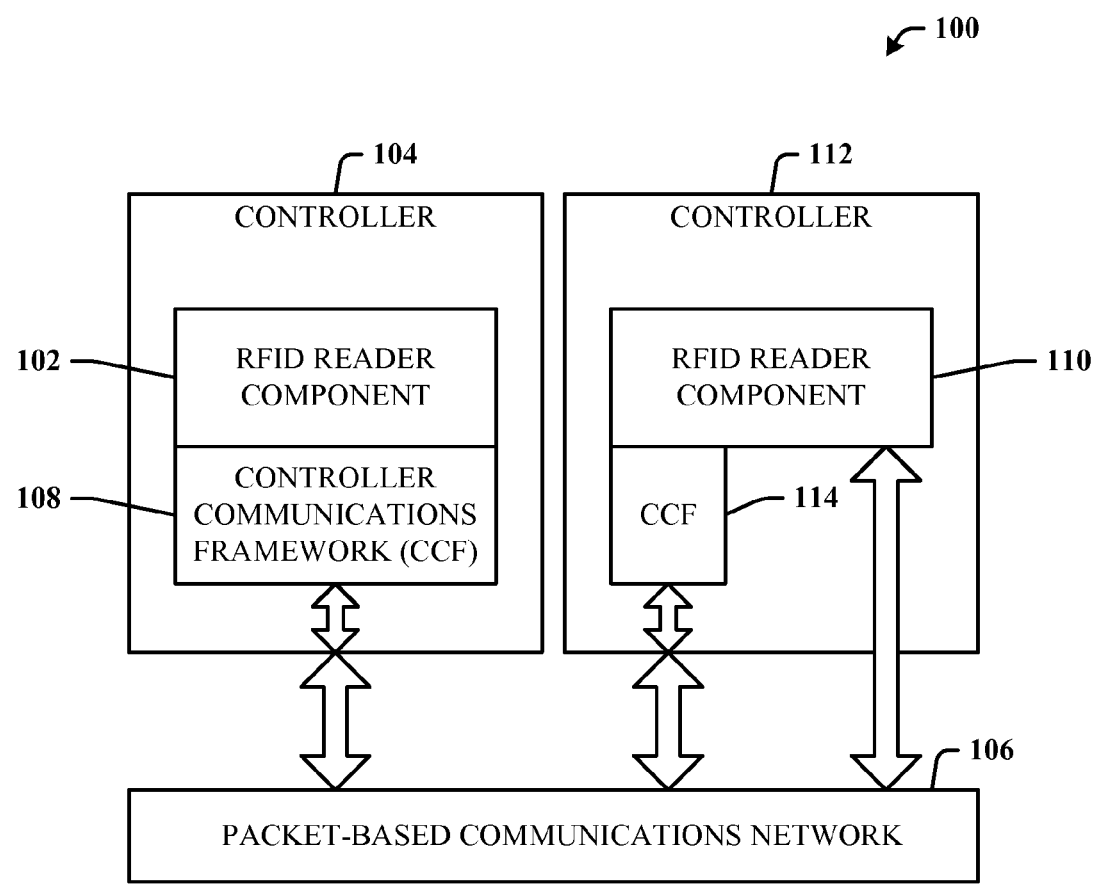
FIG. 1 illustrates an RFID system in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates an RFID (radio frequency identification) system 100 in accordance with the subject invention. The system 100 can include an RFID reader component that can be employed in a number of different locations. It is to be appreciated the system 100 can employ strictly an RFID reader; however, the combined functionality of the reader/writer can provide a more robust implementation, where desired. Accordingly, as understood herein, the subject invention finds application to an RFID reader/writer, as well as an RFID reader. In one implementation, a first RFID reader component 102 can be employed in a controller 104 (e.g., a programmable logic controller—PLC) that connects indirectly to a packet-based communications network 106 via an internal controller communications framework (CCF) 108. The controller 104 can typically be utilized in a manufacturing, distribution, sales or any similar environment where products (or objects) are tagged with an RFID tag and logistically managed. The RFID reader component 102 interfaces to the network 106 via an internal network connection(s) of the controller 104.

In such highly automated environments, PLCs (or other types of industrial controllers) are typically employed in a crate or chassis (not shown) in a rackmount configuration at selected locations throughout the industrial environment with additional modules employed therein for such applications as discrete I/O, power, communications, etc. The crate can interface to the network 106 to which modules of the crate connect for intercommunications with each other and external components (e.g., networks, databases, other rackmount systems, . . . ). The PLC typically provides the "brains" of the crate, although this need not always be the case, since each module of the crate can employ its own processor and applications for execution. Additionally, or alternatively, each module of the crate can be configured as a separate addressable node on the network 106. The network 106 is suitable to accommodate protocols such as Ethernet, CIP, DeviceNet, ControlNet, and other packet-based architectures.

In another implementation, a second RFID component 110 can be employed internal to a second controller 112 as a separate module that in one instance interfaces directly to the network 106, and in another instance interface to a CCF 114 for internal communications only. In this manner, many such RFID reader components can be employed in combination with a controller. Here, the second controller 112 can also communicate directly with the network 106. Utilization of the packet-based network can facilitate addressing each of the modules (102, 104, 110, and 112) separately using packet header information that defines a destination and source for each packet.

It is to be appreciated that any combination of the aforementioned configurations can be employed. For example, in one application it may be beneficial to include an RFID reader component in a controller thus preserving space in the crate for other modules. In another application, the controller/RFID component combination can be employed with another RFID reader component as a separate module for backup purposes in a more critical environment where if one RFID reader component fails, the other is online and ready to be enabled. In yet another application, both (or multiple) of the RFID reader components are operational and reading the same data that is then compared to ensure proper reads. These are but a few examples of the combinations of reader components (102 and 110) that can be employed in a controller/crate (or network) configuration in accordance with the subject invention.

The subject invention can support all types of RFID readers and reader/writers from low frequency to high frequency, UHF (ultra-high frequency), and standard RFID tags to 2.4 GHz tags, for example. This can also be applied to the Logix™ systems, SLC (Small Logic Controller), and PLC architectures.

Following are at least some of the benefits that can be obtained by employing the RFID reader in a PLC. The PLC internal communications frameworkis utilized for communications which is more reliable, thereby eliminating the need for the network. By employing the CCF for communications, missed packets for communications can be reduced or even eliminated and faster communications is enabled so that data from the RFID reader can be easily combined with other sensor information to verify the accuracy of the tag read operation. Moreover, use of CCF communications is easier to configure, debug, and troubleshoot than network communications. Additionally, since the RFID reader (or R/W) can be part of the PLC, its configuration can be stored in the PLC making replacement and initial configuration easier. The invention also reduces power consumption and bandwidth consumption by eliminating the need for a network interface between the reader and the PLC.

There is no longer any need to configure the RFID reader as a standalone device. Moreover, it reduces the complexity of interfacing the RFID reader to the PLC. This innovation increases the rate at which RFID tags can be read by eliminating the network transmission delays. The RFID tag can be read by the reader and tag data transferred directly to the memory of the PLC with no significant delay. Using an Event Task mechanism in Logix™, a task could be configured to run at the arrival of a new tag.

The invention reduces the overall size and weight of the system by eliminating the need for an external reader. The reader module can be housed in the backplane of the PLC and use the PLC power supply and/or in the backplane and use the crate power supply. This eliminates the need for an external box, power supply, and network interface.

Figure 2:
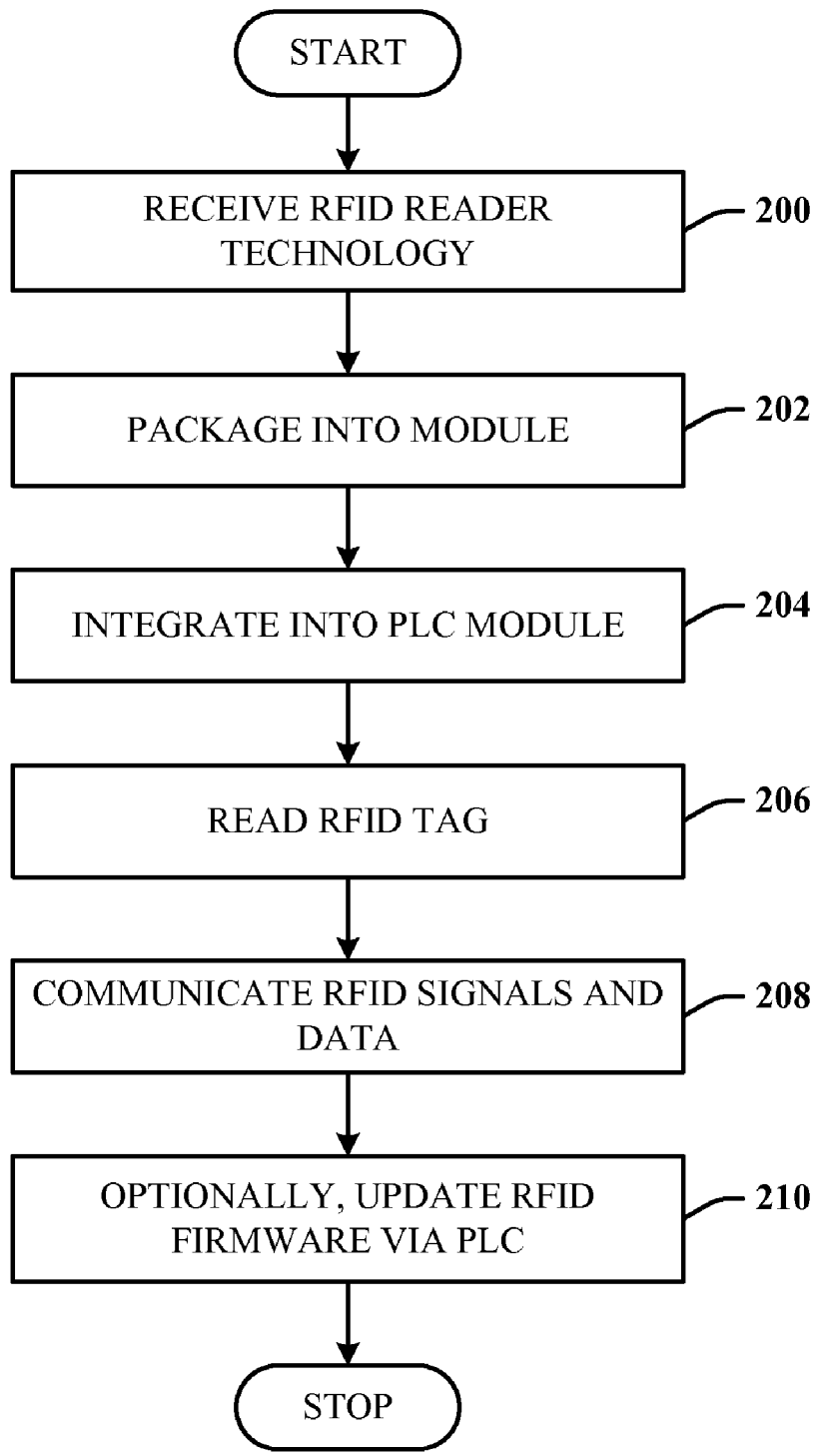
FIG. 2 illustrates a methodology of providing an RFID R/W in accordance with the invention.

FIG. 2 illustrates a methodology of providing an RFID reader in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, RFID reader technology is received for configuration. At 202, the RFID reader technology can be packaged into a module that is internalized to the PLC, and that interfaces directly with the PLC communications framework. Alternatively, or in combination therewith, the RFID reader component can be packaged as a separate module external to the PLC, but that is compatible with the crate such that it can be received into the crate in a manner similar to the PLC module. Alternatively, or in yet another combination therewith, the RFID reader component can be packaged as a separate module integral to the CCF. At 204, an RFID tag is read.

At 206, the RFID reader reads RFID tag data which is communicated by any of a number of different ways. At 208, the RFID signals and/or data can then be communicated. Where the RFID reader component is integrated into the CCF, the RFID tag data is communicated through the CCF into the controller memory. Where the RFID reader component is a separate module of the crate, the RFID tag data can be communicated out the RFID reader module across the crate network medium to the PLC where it can be processed and stored.

Modularization of the RFID reader component also provides other benefits. For example, at 210, firmware updates can be more easily implemented by downloading such updates to the controller, and over the CCF to the RFID reader module integrated into the CCF.

Figure 3:
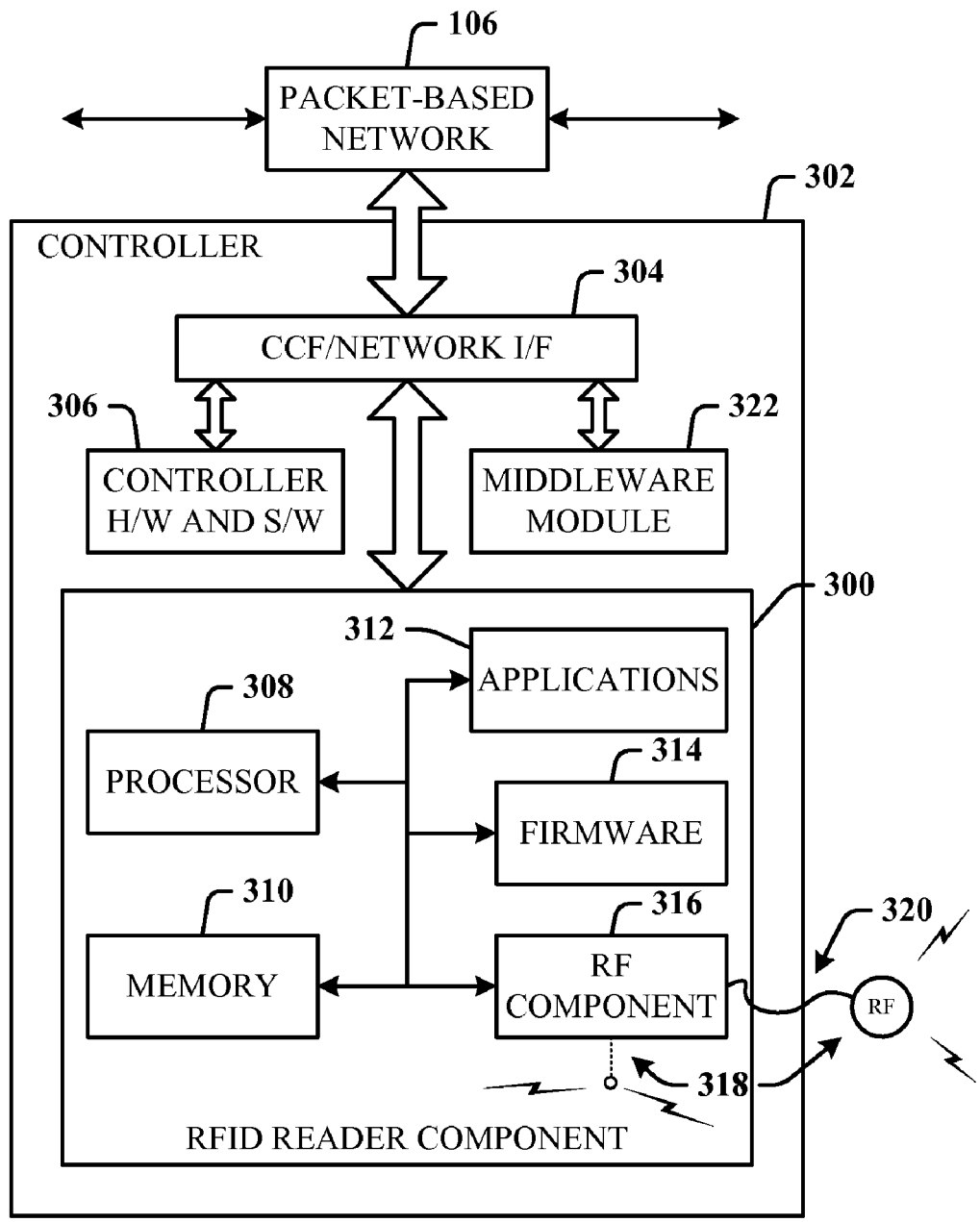
FIG. 3 illustrates a block diagram of an RFID R/W component internal to a controller in accordance with the invention.

Referring now to FIG. 3, there is illustrated a block diagram of an RFID reader component 300 internal to a controller 302 (e.g., a PLC) in accordance with the invention. The controller 302 interfaces to the packet-based network 106 via a CCF/network interface 304. Similarly, internal controller hardware and/or software components 306 can also connect to the CCF/network interface 304.

The RFID reader component 300 can include the following: a processor 308 that handles all onboard operations thereof; a memory 310 for storing RFID tag data and/or caching RFID applications used by the component 300; an applications component 312 that stores one or more applications related to reading and/or writing RFID signals and data with an RFID tag, intermodule communications applications, and applications that facilitate communications with external RFID subsystems; a firmware component 314 that stores startup information and instructions which can be updated, as well as the applications; and, an RF communications component 316 that facilitates RF communications such that an RFID tag can be read from and/or written to. Associated with the RF communications component 316 is an antenna 318 which can be internal to the RFID reader component 300, and/or be external thereto and connected via a coaxial cable 320.

The RFID reader component 300 plugs or hard connects into the CCF/network interface 304 of the controller 302 for tight integration with the controller 302. For example, the RFID reader component 300 interface to the CCF/network interface 304 can include support for the CIP open protocol to allow direct communication with the controller 302, and/or a middleware module 322. The middleware module 322 is a software component that facilitates onboard processing of tag signals and data by the controller 302, instead of remote processing on a separate PC, as can be performed conventionally. RFID tag data is packaged into an application-level protocol (e.g., CIP) by the RFID reader component 300 and transmitted over the CCF/network interface 304 to the controller 302. Additionally, the controller 302 may now act as the "master" in the CCF and/or network, and interact with the RFID reader component 300 in the same manner as it interacts with other input and output devices.

This tighter integration between the controller 302 and the RFID reader (or R/W) component reduces programming and configuration time during the commissioning of an RFID-enabled system. Additionally, the controller 302 can provide "secure" storage of RFID data and attributes as an intermediate step to moving the data to a website. Such a system can be called an RFID-enabled controller.

In one aspect of the invention, the middleware module 322 can be tightly integrated with the CCF/network interface 304. This provides a single hardware and software environment (and lowest cost solution) to the user. This solution is designed for reliable operation in an industrial environment, and finds application where RFID tags may also be utilized to send diagnostics data along with the tag data. The diagnostics data is collected by the tag due to the presence of one or more sensors with the tag. Here, the middleware module 322 is depicted as external to the RFID reader component 300 and in direct communications with the CCF/network interface 304; however, it is to be appreciated that the middleware 322 can be integrated into the RFID component 300 or the controller hardware/software component 306.

Figure 4:
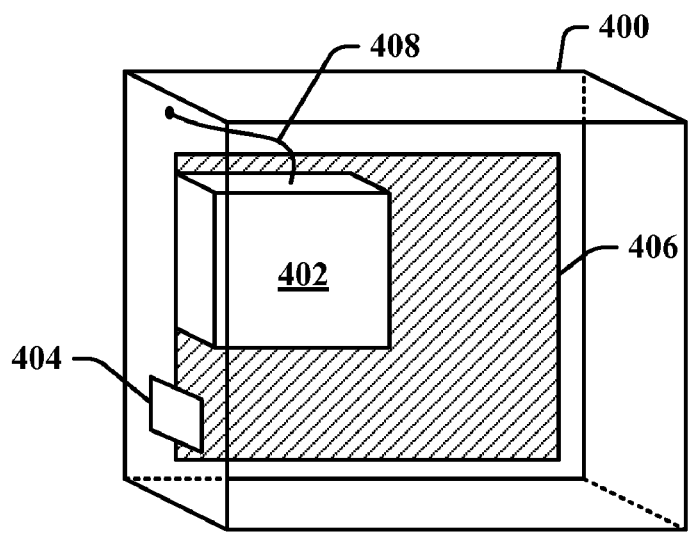
FIG. 4 illustrates a physical representation of a controller that employs an internal RFID R/W component in accordance with the invention.

FIG. 4 illustrates a physical representation of a controller 400 that employs an internal RFID reader component 402 in accordance with the invention. The controller 400 includes a CCF/network interface 404 that facilitates interconnecting to a crate (not shown). The RFID reader component 402 can also utilize the CCF/network interface 404 to connect to the crate, the controller 404, and/or other external crate modules connected to the crate. Alternatively, or in combination therewith, the RFID reader component 402 can connect to a motherboard 406 of the controller 400 such that connectivity between the RFID reader component 402 and the controller 400 is directly via the motherboard and not via the CCF/network interface 404. In this scenario, the RFID reader component 402 can be provided as an ASIC (Application Specific Integrated Circuit) that is manufactured as part of the motherboard logic and circuits. The RFID reader component 402 also includes an antenna 408 that is utilized for RF communications with RFID tags. In a more robust implementation, the RFID reader component 402 can communicate wirelessly with external systems using the antenna 408, in lieu of or in addition to using the CCF/network interface 404 to access a network.

Figure 5:
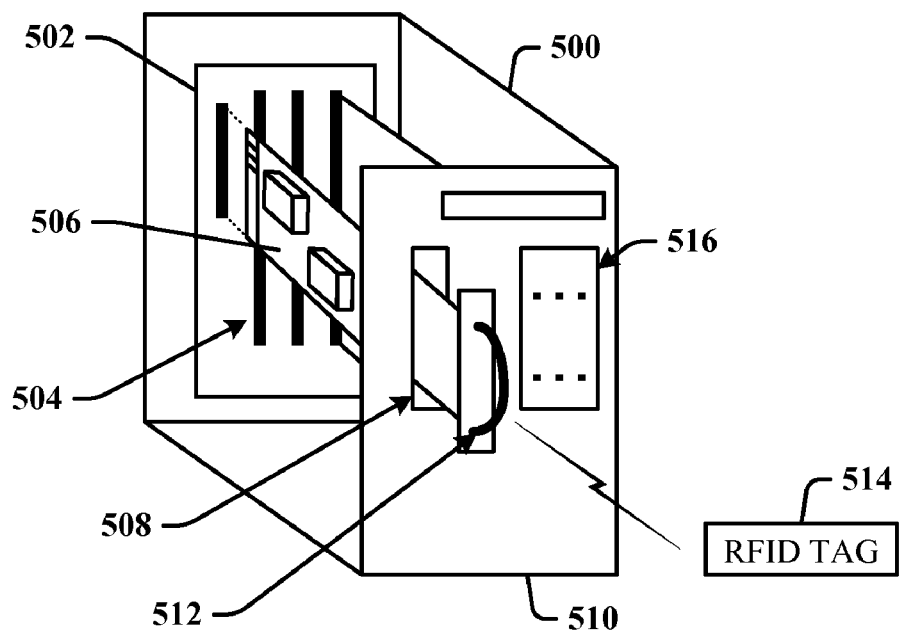
FIG. 5 illustrates a physical representation of a controller that employs a removable RFID R/W component in accordance with the invention.

FIG. 5 illustrates a physical representation of a controller 500 that employs a removable RFID reader component 502 in accordance with the invention. The controller 500 includes a CCF/network interface 502 that can include a number of connectors 504 that receive boards. For example, in this particular implementation, a RFID reader component is employed on a removable board 506 that that can be removed through a slot 508 in a front panel 510 of the controller 500. The board 506 can include a handle 512 for insertion and removal thereof, and through which an antenna (not shown) can be threaded to provide unimpeded electronic communications access to an RFID tag 514. The controller 500 can also employ front panel indicators 516 that provide indication to a user of certain states of the controller (e.g., power, network connection, RFID R/W component status, ... ).

Figure 6:
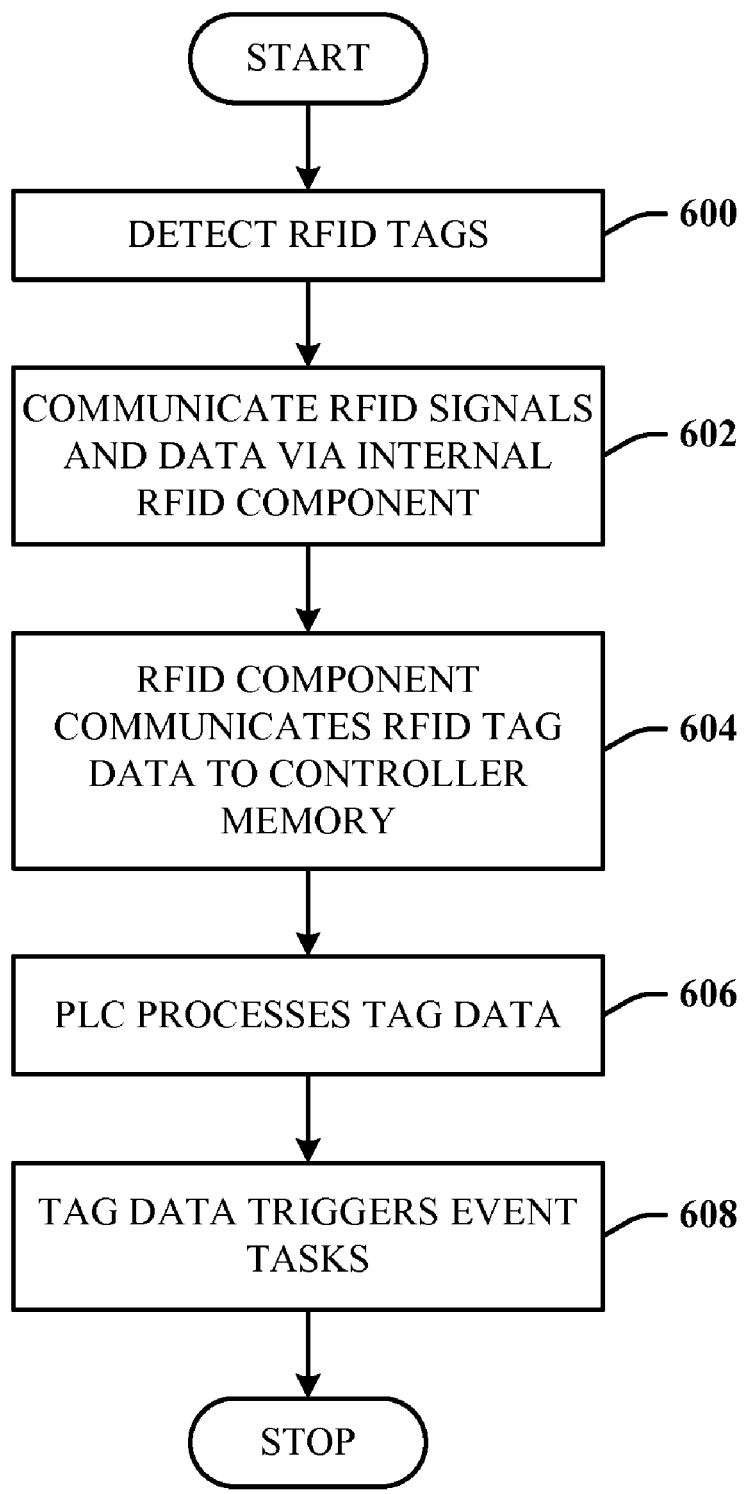
FIG. 6 illustrates a methodology of triggering event tasks in accordance with the invention.

FIG. 6 illustrates a methodology of triggering event tasks in accordance with the invention. At 600, one or more RFID tags are detected and read by an RFID reader component mounted internal to a controller. At 602, RFID data and/or signals are communicated by the internal RFID reader component. At 604, the tag data is communicated to the controller memory either directly via the CCF/network interface. At 606, the controller processes the tag data. At 608, processing of the tag data triggers one or more event tasks in the controller and/or RFID reader component.

Figure 7:
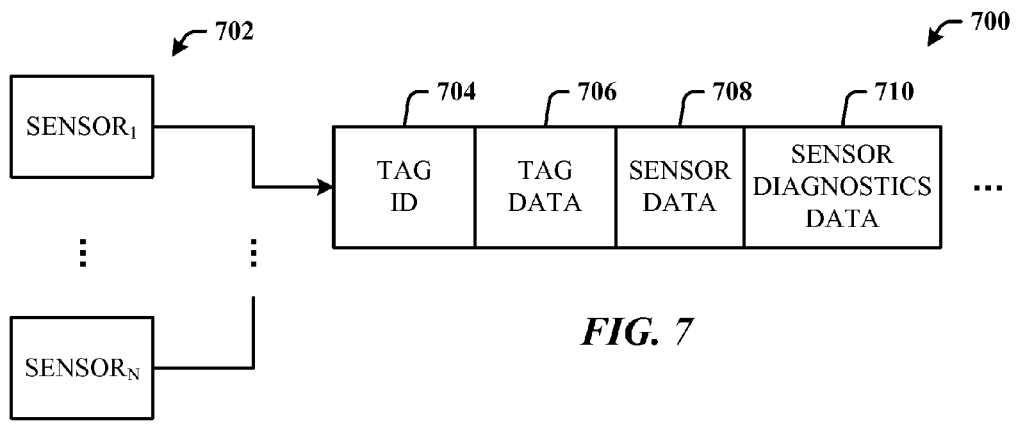
FIG. 7 illustrates an exemplary RFID tag information message that includes sensor-related data in accordance with the subject invention.

FIG. 7 illustrates an exemplary RFID tag information message 700 that includes sensor-related data in accordance with the subject invention. In one implementation, an RFID tag can be associated with one or more sensors 702 (denoted $SENSOR_1, \ldots, SENSOR_N$) such that the sensor data can be included as part of the RFID tag information message 700 that is transmitted to the RFID reader component. The sensors 702 can include environmental sensors related to temperature, humidity, barometric pressure, etc., that allows for monitoring of corresponding parameters while the associated object, package, pallet, is being prepared, shipped, and so on. Other conventional sensors can be employed as desired (e.g., accelerometers, strain gages, load cells, ... )

In support thereof, the message 700 can support tag ID data 704 that uniquely identifies the tag, tag data 706 that includes information related to the object to which it is attached or associated, sensor data 708 that is related to the one or more sensors 702 associated with the tag, and sensor diagnostic data 710 related to one or more of the sensors 702. It is to be appreciated that other information can also be transmitted with the message 700, as desired by the particular application.

Figure 8:
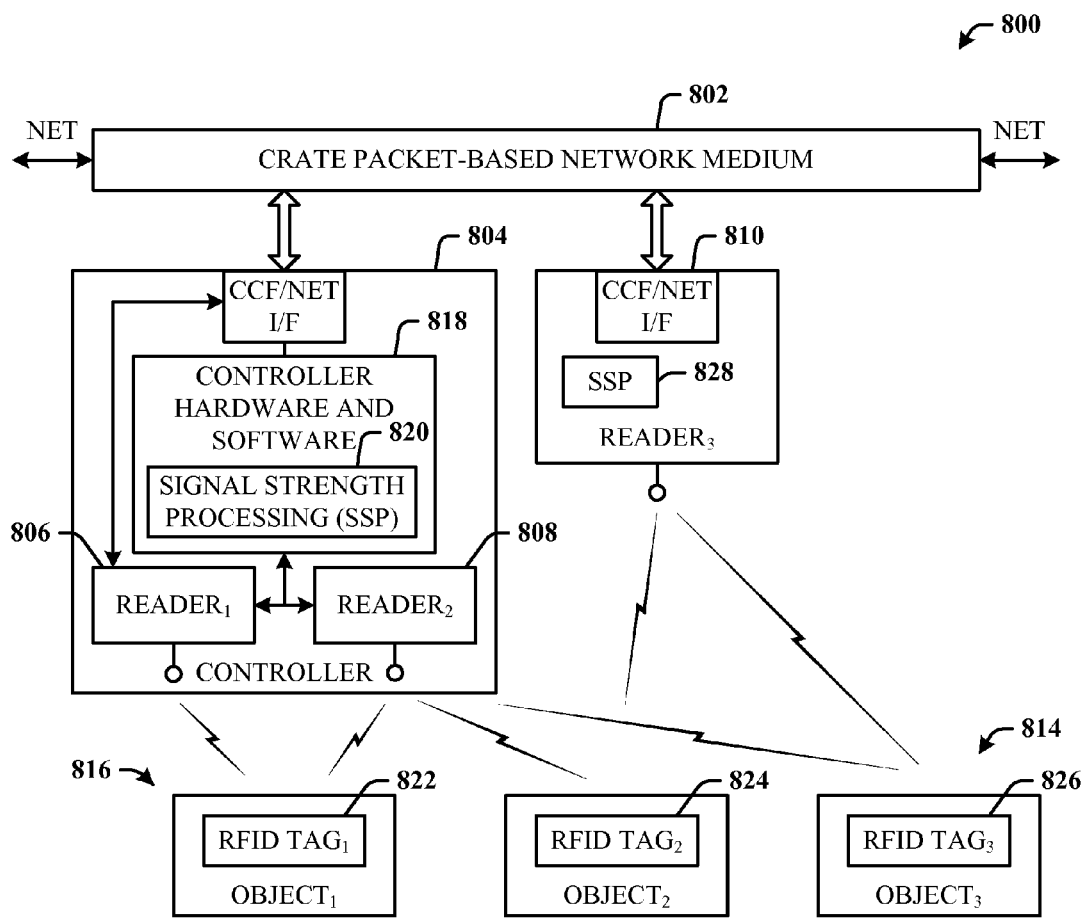
FIG. 8 illustrates a system that employs signal strength processing with multiple readers in accordance with the invention.

FIG. 8 illustrates a system 800 that employs signal strength processing with multiple readers in accordance with the invention. In another aspect of the invention, multiple readers can be integrated with the controller. Filtering across multiple RFID readers is difficult today and requires significant implementation effort. The controller implementation of the subject invention can utilize signal strengths from individual readers to determine which reader may "own" a tag.

Accordingly, there can be provided in one implementation a crate packet-based network medium 802 that facilitates communications between at least a controller 804 that includes a first internal reader 806 (denoted READER$_1$) and a second internal reader 808 (denoted READER$_2$), and an external RFID reader 810 (denoted READER$_3$). Here, the controller 804 includes the first reader 810 and second reader 812 one or both of which can be used for reading RFID tags 814 (denoted RFID TAG$_1$, RFID TAG$_2$, and RFID TAG$_3$) attached to corresponding objects 816 (denoted OBJECT$_1$, OBJECT$_2$, and OBJECT$_3$). The controller 804 and the external reader 810 each include a CCF/network interface (denoted CCF/NET I/F) that is one of the interfaces to the crate network medium 802.

The controller 804 can also include a hardware/software component represented at 818 that provides all desired controller-based hardware/software functionality. The component 818 can also include a signal strength processing component 820 that facilitates signal strength processing among several of the local readers (806, 808, 810 and 812). This can also include remote readers (not shown) that may be "slave" modules in remote crates (not shown), but that are managed by the controller 804 (the "master"). In this master/slave relationship, the slave devices are treated as I/O devices and interact with the controller 804 in the same manner as other I/O modules. In that the RFID data is now stored in the controller 804, the controller 804 can provide secure storage of the data and associated attributes as an intermediate step to communicating the data and/or attributes to a website (e.g., Internet-based website).

As described supra, conventionally, when passive transponders are employed, a reader broadcasts energy that energizes all tags in a given vicinity, thereby receiving data back that it may not need. The read operation can occur many times (e.g., hundreds or thousands) over a short period of time. If a pallet comes into range, and the pallet includes a tag, the objects on the pallet each include a tag, and the objects further include items therein that each include tags, the amount of read information can be large. In such a scenario, the reader can be programmed to perform a read only for a short period of time (e.g., milliseconds), and then turn off. Thereafter, the middleware software can be activated to process the tag information that was read. Note that the middleware software need not reside in the controller, but can reside anywhere on the network, or perhaps in a separate module in the same crate as the controller 804. Similarly, with active transponders, the tag automatically sends its tag data when signaled to do so by readers that are broadcasting.

Alternatively, of the active tag includes clock logic, the tag can be programmed to transmit data at predetermined times (e.g., every hour). Here, the internal readers (806 and 808) signal a first tag 822, a second tag 824 and a third tag 826 to send their respective tag data. However, in an environment where there may be hundreds or even thousands of objects and associated tags devices, and which objects/tags can be moving at a high rate of speed (e.g., on an assembly line), the data handling requirements can place a significant burden on the control system. Thus, it can be beneficial for any given reader and the control system in general, to only read tags that are within its range. The signal strength processing component 820 facilitates this by monitoring and computing signal strength values that are processed by the controller 804 and then used to filter readers and tags.

In this example, once the controller 804 receives a return tag signal from each of the three tags (822, 824, and 826), signal strength values are computed. Knowing the location of the external reader 810 and/or the internal readers (806 and 808), the controller 804 can then "assign" the tags (822, 824, and 826) to the respective readers (806, 808, and 810) for processing in order to offload some of the processing requirements that would normally need to be performed on all three of the tags (822, 824, and 826), to the other readers.

Alternatively, each system can include signal strength processing (S SP) capability. For example, the controller 804 can include the SSP 820, and the external reader 810 can also include an SSP 828. Thus, each system performs its own signal strength value computations and transmits the values to the controller 804 for final determination as to which of the readers (806, 808 and 810) gets assigned to process which of the tags (822, 824, and 826). In this example, the first internal reader 806 is assigned to process the tag data for the first tag 822 and the external reader 810 is assigned to process the tag data for the second tag 824 and the third tag 826.

Figure 9:
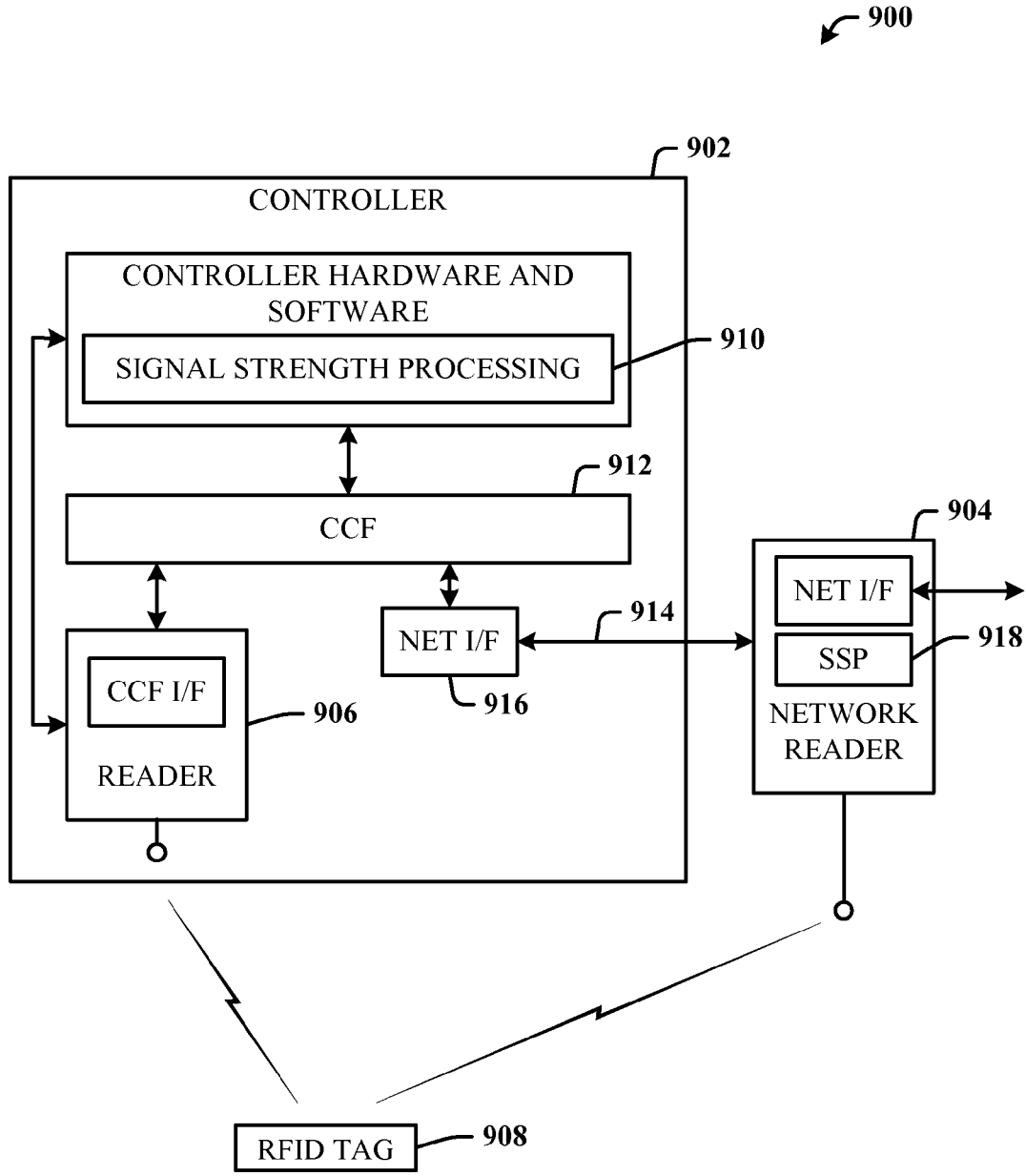
FIG. 9 illustrates a system where a controller communicates with a remote network-based reader in accordance with the invention.

FIG. 9 illustrates a system 900 where a controller 902 communicates with a remote network-based reader 904 in accordance with the invention. The controller 902 includes an internal reader 906 for reading an RFID tag 908. The controller 902 also can include a signal strength processing component 910 that processes return tag signals in order to determine a signal strength value for the tag 908. The controller 902 includes a CCF 912 that facilitates interfacing to a network 914 via a network interface 916. Interfacing to the network 914 can be by way of a wired and/or wireless technology. Disposed on the network 914 is the remote reader 904 that can also read the RFID tag 908. The remote reader 904 can also include an SSP component 918 that facilitates signal strength value computation such that a value associated with reading the tag 908 can be transmitted to a remote site for processing (e.g., the controller 902). In this scenario, the controller 902 receives and processes the remote value with a local value received via the internal reader 906. The controller can then determine which reader should be assigned to process tag data of the tag 908.

Figure 10:
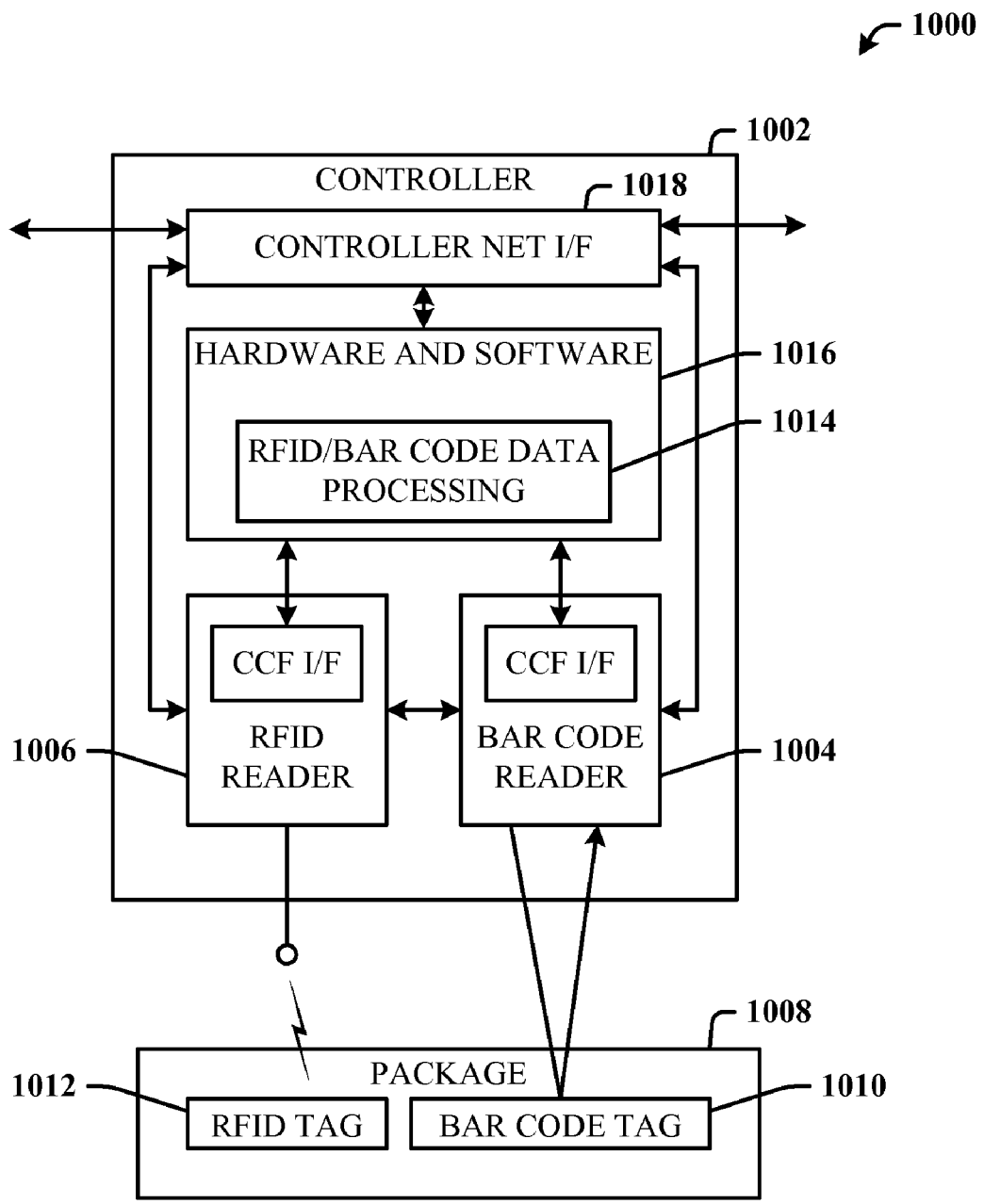
FIG. 10 illustrates a bar code-RFID reader system in accordance with the invention.

In many conventional systems, RFID technology is being used in concert with bar codes. Since bar code readers are already integrated with the controller, the controller can now coordinate the data of a bar code with the data of a corresponding RFID tag. Accordingly, FIG. 10 illustrates a bar code-RFID reader system 1000 in accordance with the invention. The system 1000 includes a controller 1002 that comprises both a bar code scanner 1004 and an RFID reader 1006. When a package 1008 passes within range to be processed, the internal bar code scanner 1004 scans a bar code tag 1010 attached to the package 1008 and the internal RFID reader 1006 reads an attached RFID tag 1012. The bar code data and RFID data are then passed to an RFID/bar code data processing component 1014 of controller hardware and software component 1016 that processes and compares some or all of the tag data as a means to verify package and tag data, for example. Although both the RFID reader 1006 and the bar code scanner 1004 are shown to be internal to the controller 1002, either or both can be separate modules as the controller 1002 in the same crate or different crates as desired for a given application. The bar code reader 1004 and the RFID reader 1006 are shown to interface to the hardware/software component 1016 via CCF interfaces, and can also interface to a controller network interface 1018 for network access to services disposed thereon (such as can be provide on an Ethernet network, DeviceNet network, ControlNet network, and other packet-based networks).

Figure 11:
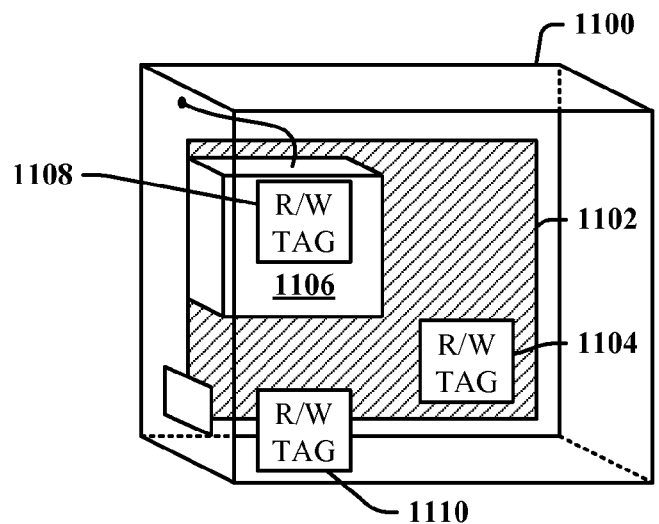
FIG. 11 illustrates the use of RFID R/W technology for tagging controller components in accordance with the subject invention.

FIG. 11 illustrates the use of RFID R/W technology for tagging controller components in accordance with the subject invention. RFID R/W tag technology be incorporated into all major controller (e.g., PLC) components and utilized for wireless communication both between controller system components and between the controller and other devices, locations, and media. The use of RFID to store and exchange information includes the following uses: electronic keying— RFID in a rack and on modules can now be processed for agreement; security information can be based and stored at the physical device level, whereas a processor could be at a different level than I/O; module diagnostics and warranty information can be read from the tagged module without the current requirement to program logic to monitor diagnostic bits, for example; series and revision levels code be read and verified more easily; a rack-based tag can store the I/O configuration, for example, so that a replacement module can easily be inserted and powered up sooner; and, a smart module would automatically know it is a valid replacement and could automatically read its configuration and setup information.

Referring again to FIG. 11, a controller module 1100 (similar to the controller 400 of FIG. 4) is provided with RFID tags on selected components. For example, the controller 1100 includes a motherboard 1102 having an associated motherboard RFID read/write tag 1104, an internal RFID reader 1106 having an attached RFID read/write tag 1108, and a controller RFID read/write tag 1110 attached to the controller 1100. Each of the tags (1104, 1108, and 1110) stores data related to its corresponding component (1102, 1106, and 1100).

Note that if passive RFID tags are employed on components internal to the controller itself, and with the reader integrated therein, the reader will continuously read the internal passive tags, thereby causing unnecessary tag processing. By employing active tags, communications with the reader can now be initiated from the active tag when events and/or attributes change or when it is expected that the reader should have received data or information.

Figure 12:
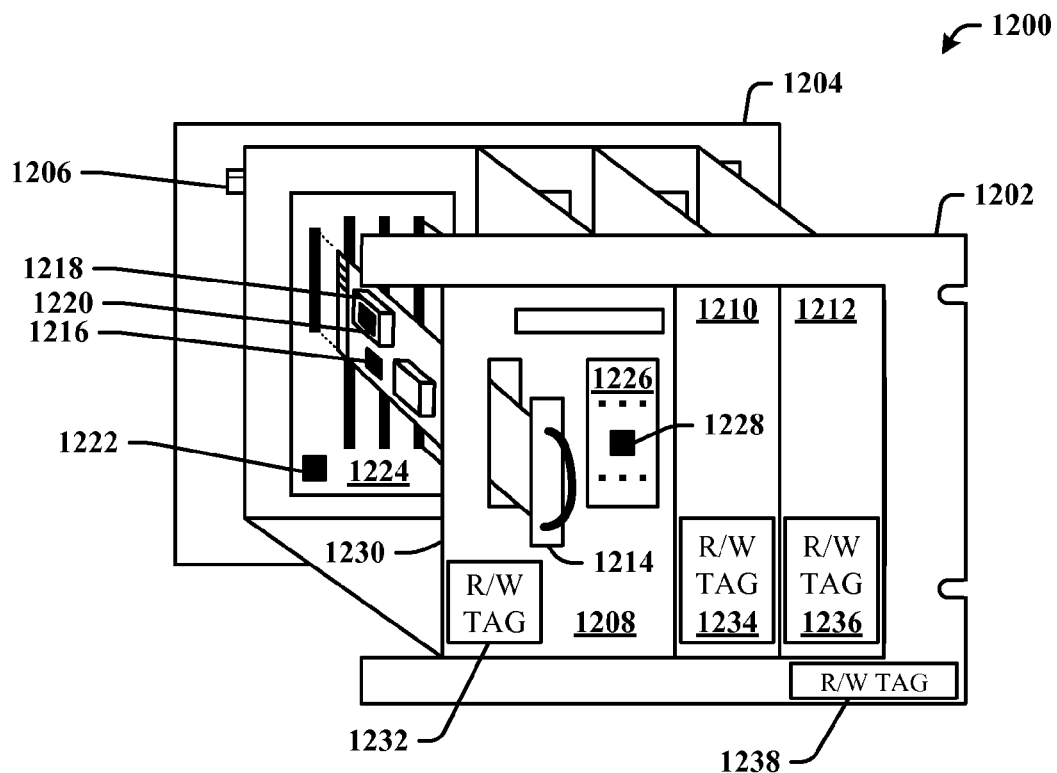
FIG. 12 illustrates the use of RFID R/W technology for tagging crate components and modules in accordance with the subject invention.

FIG. 12 illustrates the use of RFID R/W technology for tagging crate components and modules in accordance with the subject invention. A crate 1200 is shown having a crate front panel 1202, and a back panel 1202 with a network medium 1206 (e.g., wired, optical fiber . . . ) that can electrically/electronically interconnect a controller module 1208, a first module 1210 and a second module 1212. The controller 1208 includes internal components that can also be tagged. For example, the controller 1208 includes a slidably removable card 1214 that has attached thereto a card tag 1216 that stores data related to that card 1214. Additionally, the card 1214 includes a card module 1218 that has attached thereto a card module tag 1220 that stores data related to that card module 1218. The controller 1208 can also have an internal RFID tag 1222 that identifies a controller back panel 1224, for example, and its related components, connectors, etc. The controller 1208 can also include an indicator module 1226 having an indicator module RFID tag 1228 that stores related data. Affixed to a front panel 1230 of the controller 1208 is a controller RFID tag 1232 that can include component data of some or all of its related components (e.g., card 1214, card module 1218, back panel 1224, front panel 1230, controller settings data, configuration data, warranty data, diagnostics data, . . . ).

Likewise, the first rack module 1210 includes a first module RFID tag 1234 that can store some or all hardware and/or software information related thereto, and the second rack module 1212 includes a second module RFID tag 1236 that can store some or all hardware and/or software information related to it.

The crate front panel 1202 has affixed thereto a crate RFID tag 1238 that can contain data related to the crate 1200 (e.g., backplane 1206) and any or all of its modules and/or module subcomponents (e.g., controller 1208, first module 1210, second module 1212, card module 1218, . . . ). If the card 1214 is an RFID R/W component, it can read data from all crate, module, and component tags, and write data to the same tags.

Figure 13:
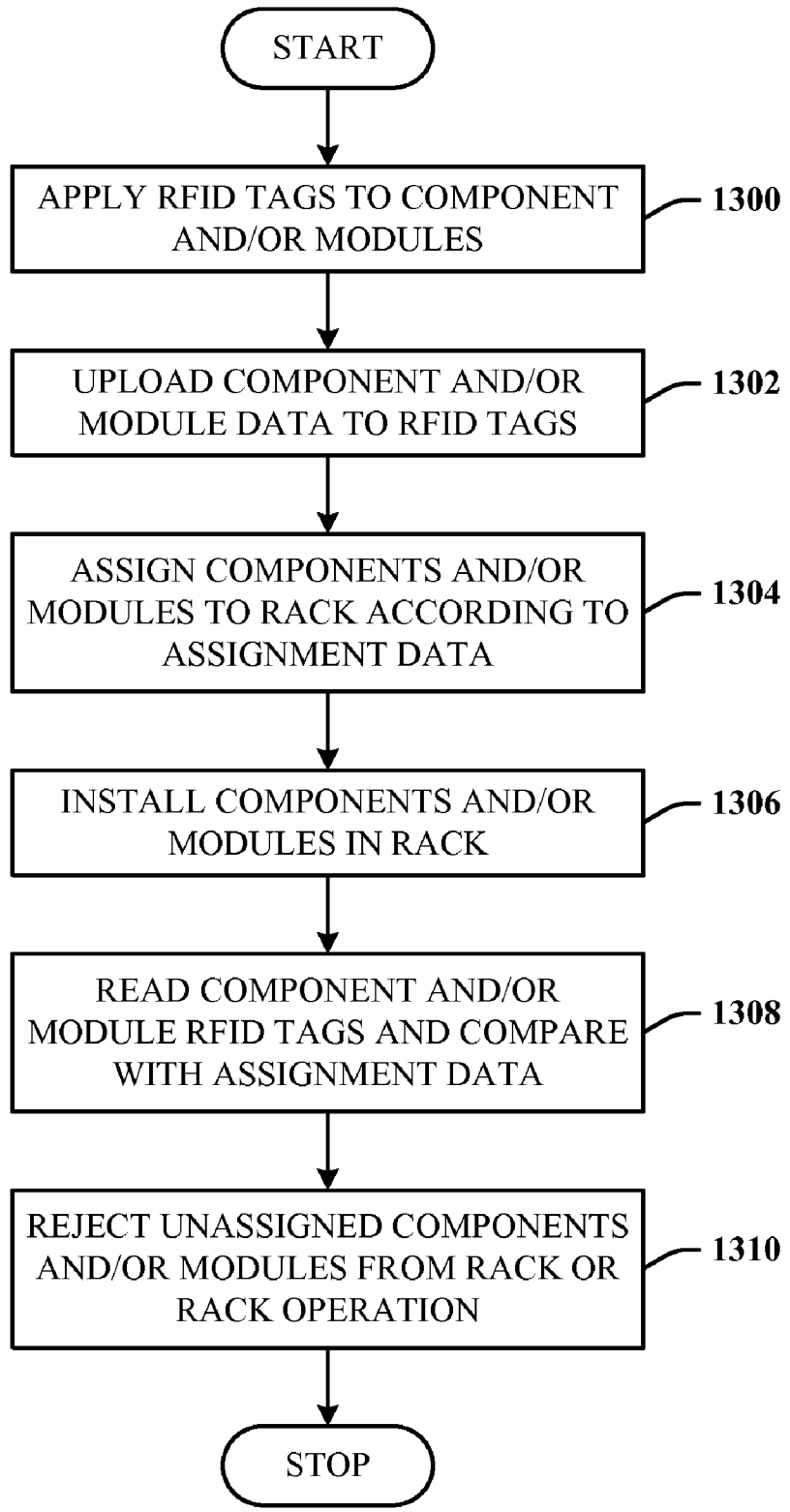
FIG. 13 illustrates a methodology of utilizing electronic keying in an RFID tag to verify proper component assignments in accordance with the invention.

FIG. 13 illustrates a methodology of utilizing electronic keying in an RFID tag to verify proper component assignments in accordance with the invention. At 1300, an RFID tag is applied to each component and/or module as desired. Where this is a software component or module, an RFID tag can be applied to any convenient place. At 1302, component and/or module data is uploaded to each corresponding tag. At 1304, the components and/or modules are assigned to a rack according to assignment data. At 1306, the components and/or modules are installed into the rack. At 1308, once installed, each tag is read to ensure that the installed components and/or modules are the ones desired to be installed. At 1310, any component and/or module that does not conform to the assignment data is rejected. That is, an alert or notification can be communicated. Additionally, the component and/or module can be prevented from operating.

Figure 14:
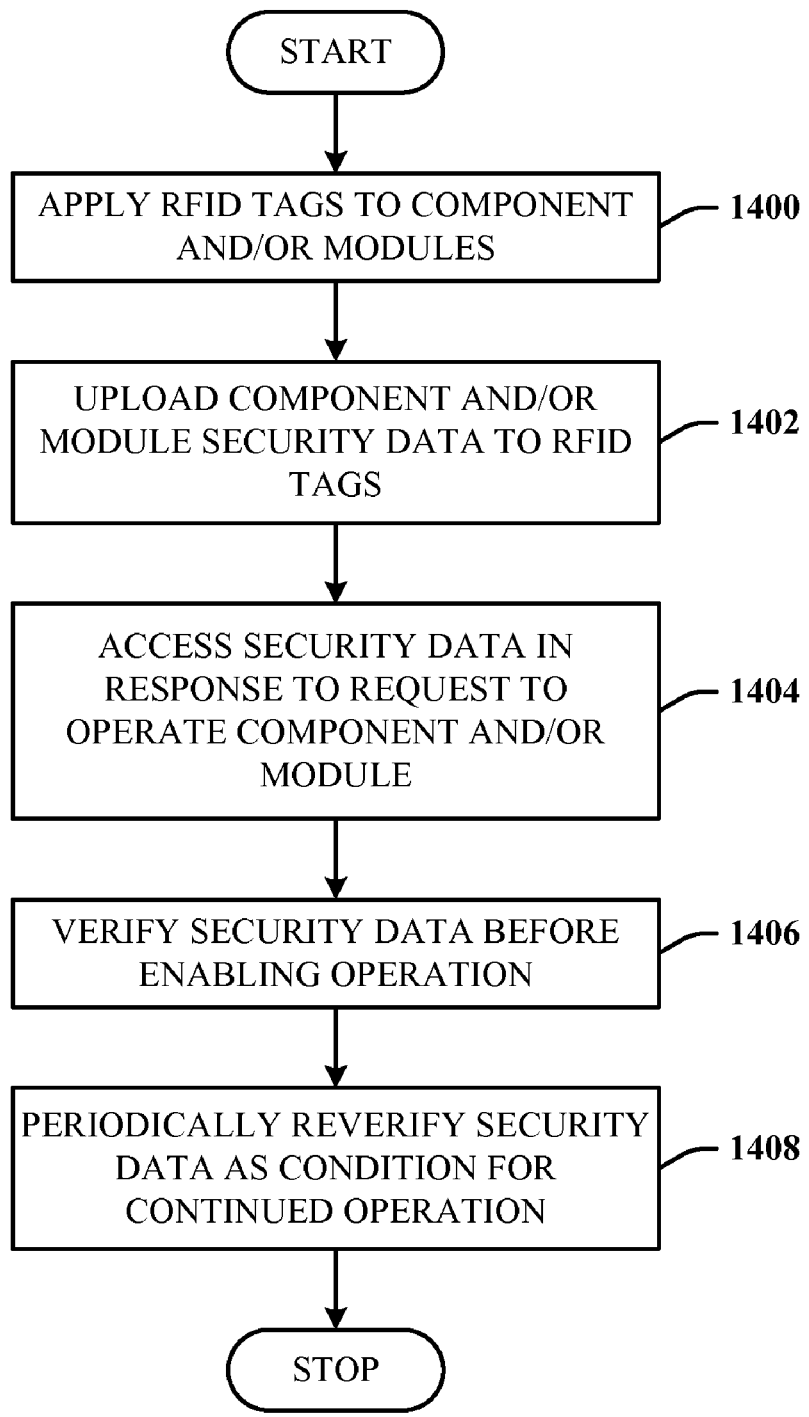
FIG. 14 illustrates a methodology of security information in an RFID tag to enable component operation in accordance with the invention.

FIG. 14 illustrates a methodology of security information in an RFID tag to enable component operation in accordance with the invention. At 1400, apply RFID tags to components and/or modules. At 1402, upload component and/or module security data to RFID tags. At 1404, access security data in response to a request to operate the component and/or module. At 1406, verify the security data before enabling operation. At 1408, the system can periodically reverify the security data as a condition for continued operation.

Figure 15:
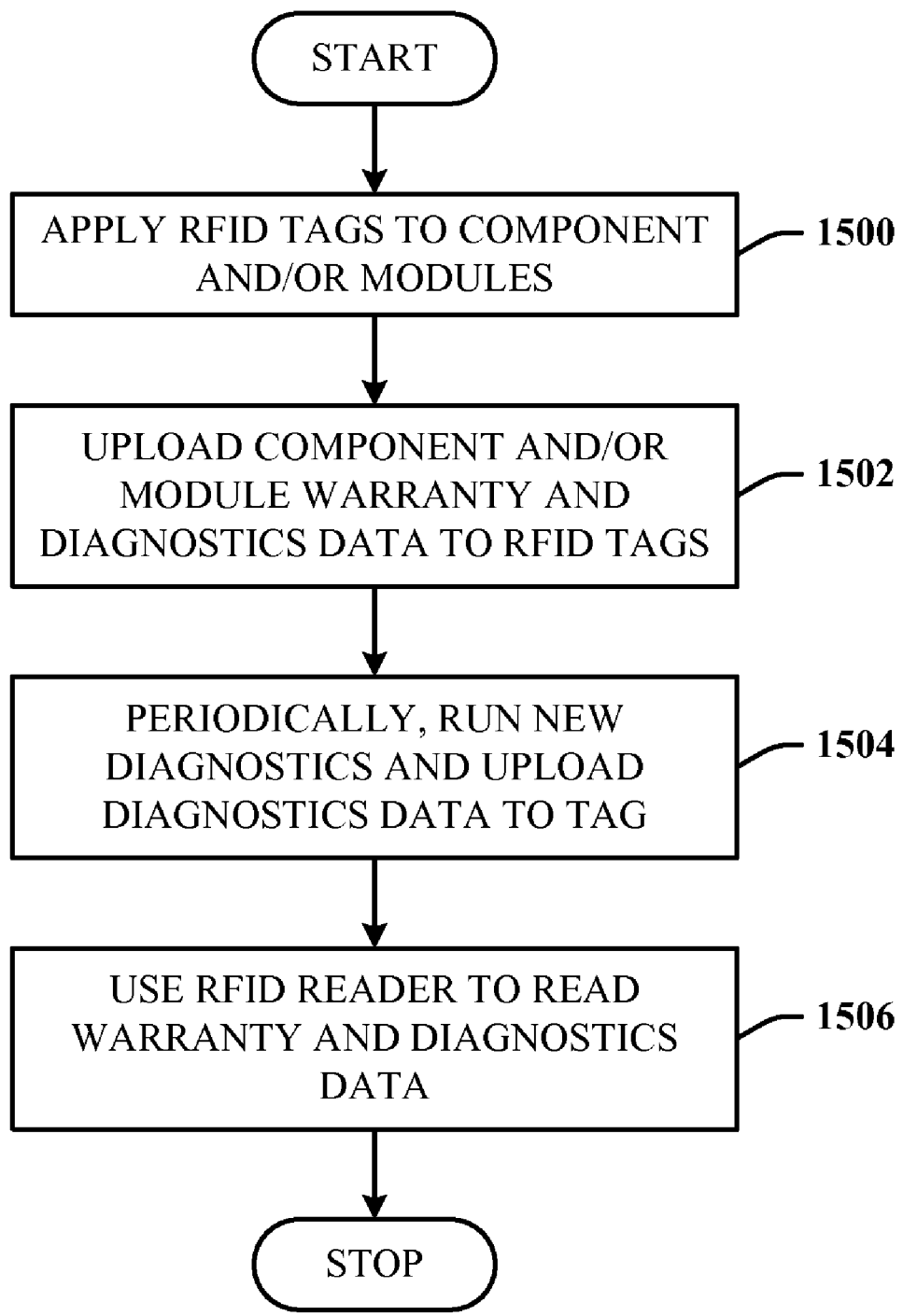
FIG. 15 illustrates a methodology of processing warranty and diagnostics information in an RFID tag in accordance with the invention.

FIG. 15 illustrates a methodology of processing warranty and diagnostics information in an RFID tag in accordance with the invention. At 1500, apply RFID tags to components and/or modules. At 1502, upload warranty and/or diagnostics data to the RFID tags. At 1504, periodically, run new diagnostics and upload new diagnostics data to RFID tag. At 1506, use RFID reader to read warranty and/or diagnostics data, as desired.

Figure 16:
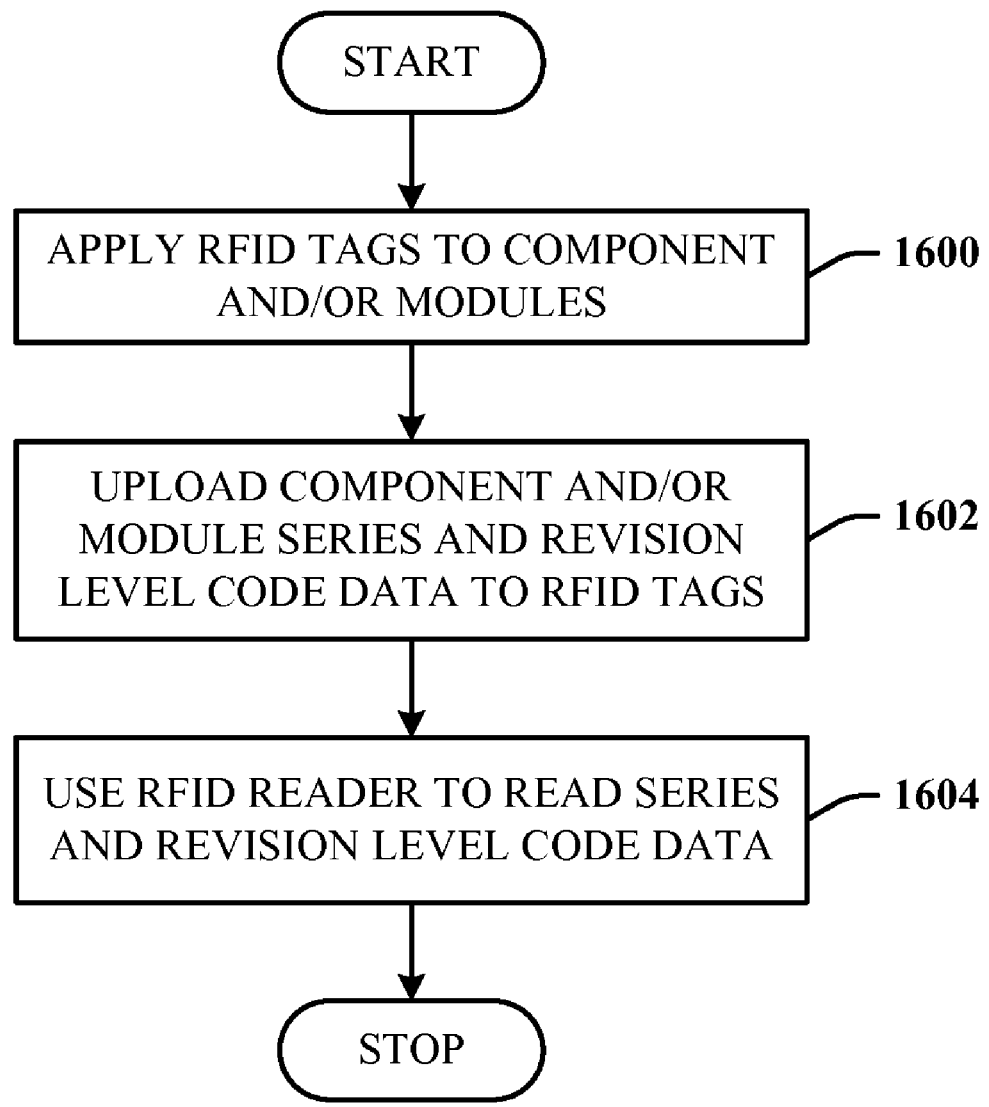
FIG. 16 illustrates a methodology of utilizing series and revision level code information in an RFID tag in accordance with the invention.

FIG. 16 illustrates a methodology of utilizing series and revision level code information in an RFID tag in accordance with the invention. At 1600, apply RFID tags to components and/or modules. At 1602, upload series and/or revision level code data to RFID tags of corresponding components and/or modules. At 1604, use RFID reader to read series and/or revision level code data of component.

Figure 17:
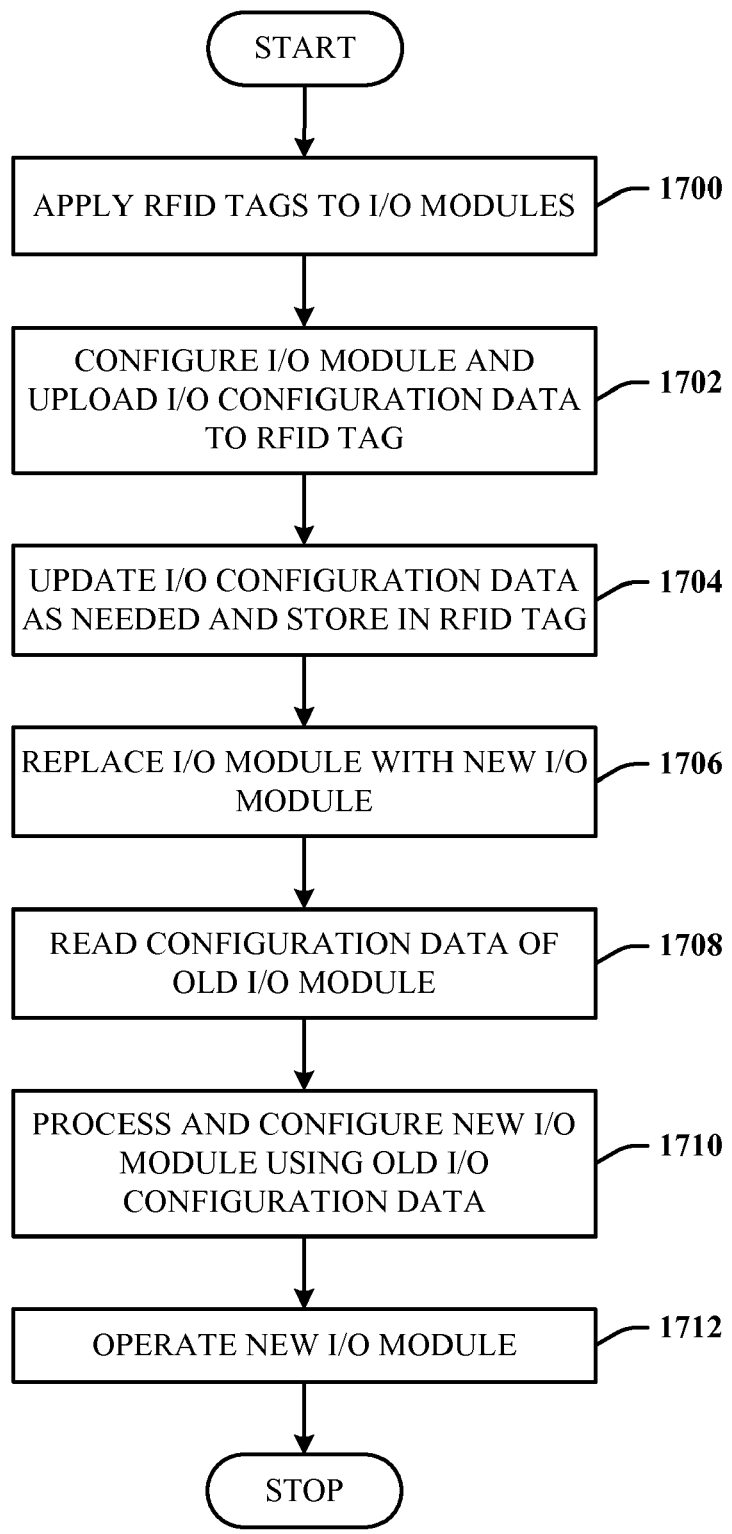
FIG. 17 illustrates a methodology of utilizing module I/O configuration information in an RFID tag in accordance with the invention.

FIG. 17 illustrates a methodology of utilizing module I/O configuration information in an RFID tag in accordance with the invention. At 1700, apply RFID tags to I/O modules. At 1702, configure an I/O module and upload I/O configuration data to corresponding RFID tag. At 1704, update the I/O configuration data as needed, and store in the RFID tag. At 1706, replace the I/O module with a new I/O module. At 1708, read configuration data of old I/O module. At 1710, process and configure the new I/O module using the old I/O module configuration data. At 1712, operate the new I/O module.

Figure 18:
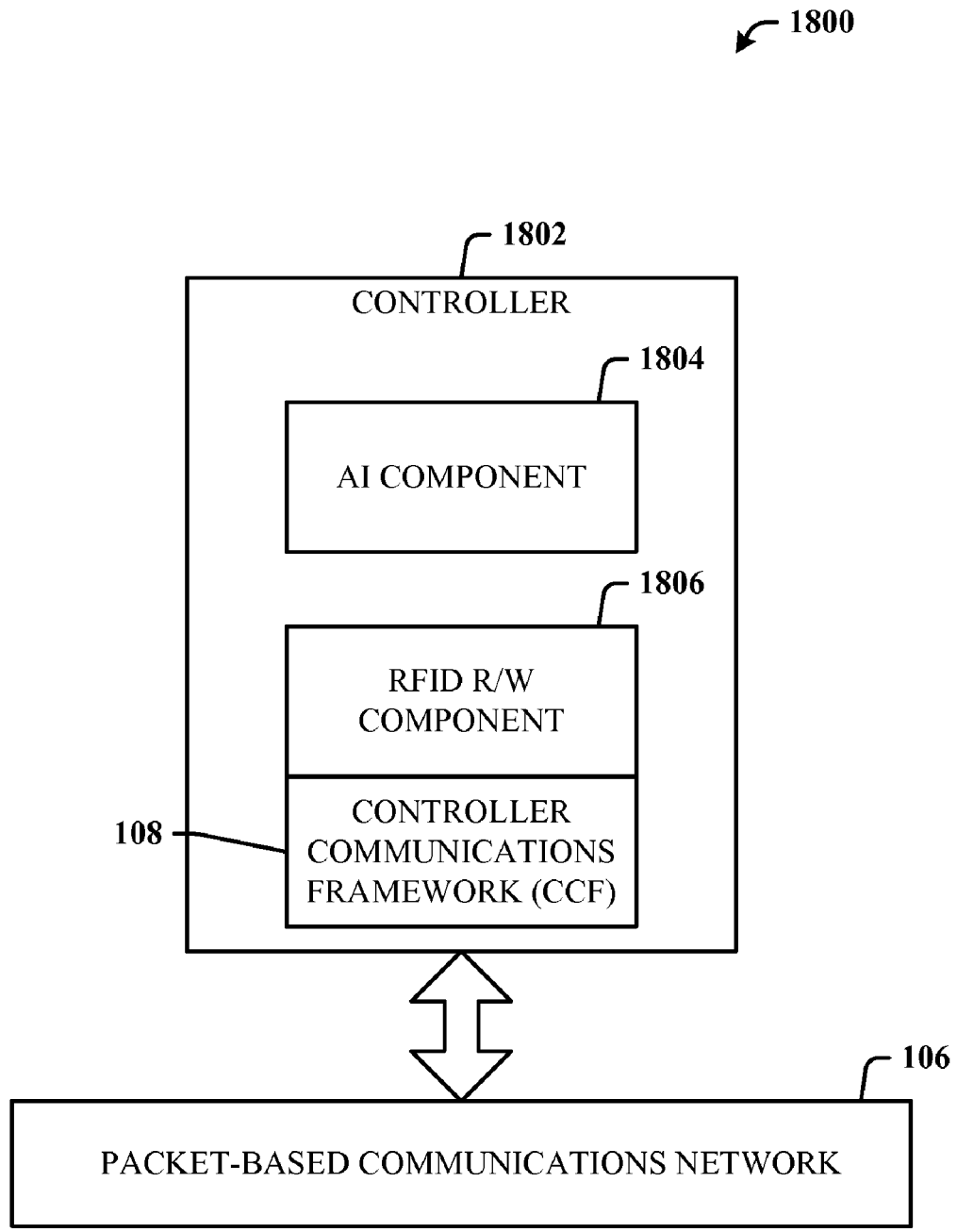
FIG. 18 illustrates an RFID system that employs artificial intelligence which facilitates automating one or more features in accordance with the subject invention.

FIG. 18 illustrates an RFID system 1800 that employs artificial intelligence (AI) which facilitates automating one or more features in accordance with the subject invention. In this implementation, the system 1800 includes a controller 1802 that hosts an AI component 1804. The AI component 1804 can monitor signals and data of the controller 1802, RFID R/W processes of an internal RFID R/W component 1806, and generally, any information that is carried over the CCF 108. Thus, information communicated on the CCF 108 and even the network 106 can also be monitored.

The subject invention (e.g., in connection with selection) can employ various AI-based schemes for carrying out various aspects thereof. For example, a process for determining when to upload diagnostics data and when to read RFID data can be facilitated via an automatic classifier system and process. Moreover, where an RFID database is distributed across locations that are remote from the controller, the classifier can be employed to determine which database location will be selected for uploading RFID data or from retrieving data therefrom.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or a training phase within a classifier constructor and feature selection module. Thus, the classifier(s) can be used to automatically learn and perform a number of functions, including but not limited to determining according to a predetermined criteria when to initiate new diagnostics testing and accelerate new diagnostics uploads to the RFID tag of a module.

The AI component 1804 can also be employed to determine under what conditions one RFID reader (or R/W) should be disabled or powered down relative to another. In another example, AI component 1804 can be employed to detect RFID tags related to a second RFID reader (not shown), and then signal the second RFID reader to turn on based on information provided that a pallet or product with a tag associated with that RFID reader is approaching. This cueing information can be provided by other sensor systems or dataform reading system (e.g., bar code scanning systems, other RFID reading systems, and so on). For example, a multi-input controller can be provided information or sense information that can aid in filtering the data. By utilizing a multi-input controller, it can be known when a pallet enters a certain area because of presence sensors that indicate when the pallet has gone through this area (e.g., using bar code label, RFID tag, . . . ). So not only signal strength data can be employed, but additional sensing data that the controller has about the environment that can be utilized for filtering. More specifically, when employing both a bar code tag and an RFID tag, the controller reads the bar code label at a previous fixed location. Since it is a fixed location, the controller "knows" the recent location of the pallet. Thus, the controller can cue the reader that the pallet will arrive at this location very shortly. As a result, the controller can cue the RFID reader to wake up and go to sleep at predetermined times or intervals. Without this capability, the reader would be on continuously, and reading anything within its RF field-of-view.

Where each RFID R/W component includes an AI component, this can include "self learning" whereby the components communicate with each other and learn patterns and/or characteristics related to the RFID R/W components, controllers, backplane activity, RFID tag activity, etc. The controller does not need to be involved in this self-learning process.

In another example, the AI component can be employed to process signal strengths and determine therefrom which R/W components to assign to tags and/or sets of tags that are in range of communication.

Figure 19:
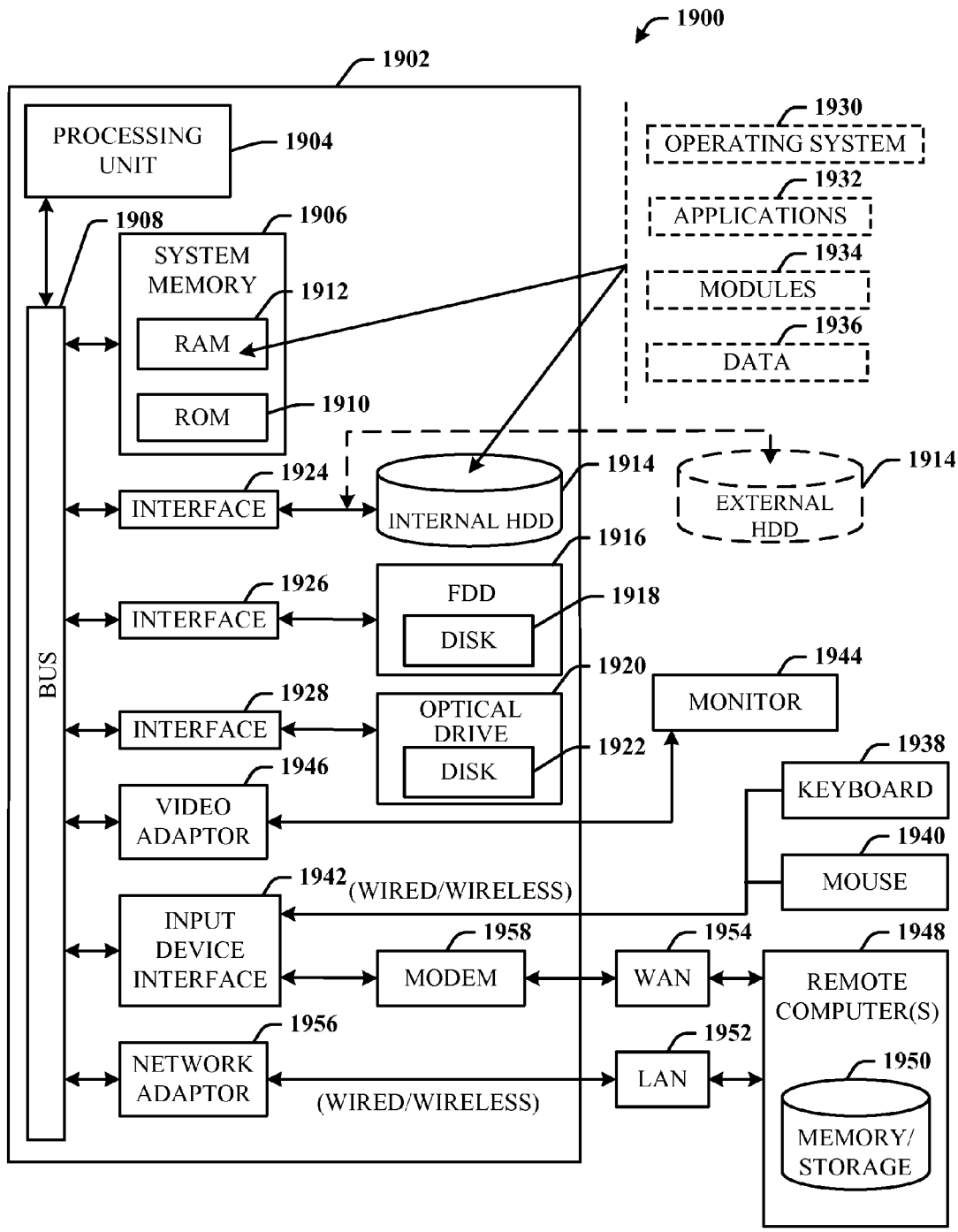
FIG. 19 illustrates a block diagram of a computer operable to execute the disclosed architecture.

Referring now to FIG. 19, there is illustrated a block diagram of a computer operable to execute the disclosed architecture. In order to provide additional context for various aspects of the subject invention, FIG. 19 and the following discussion are intended to provide a brief, general description of a suitable computing environment 1900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 19, the exemplary computing environment 1900 for implementing various aspects of the invention includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures may also be employed as the processing unit 1904.

The system bus 1908 can be any of several types of bus structure that may further interconnect to a memory bus (with or without a memory controller), a peripheral bus, and a local bus using any of a variety of commercially available bus architectures. The system memory 1906 includes read only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914 (e.g., EIDE, SATA), which internal hard disk drive 1914 may also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. It is appreciated that the invention can be implemented with various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) may include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 1394 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers, etc.

The computer 1902 may operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1902 is connected to the local network 1952 through a wired and/or wireless communication network interface or adapter 1956. The adaptor 1956 may facilitate wired or wireless communication to the LAN 1952, which may also include a wireless access point disposed thereon for communicating with the wireless adaptor 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 20:
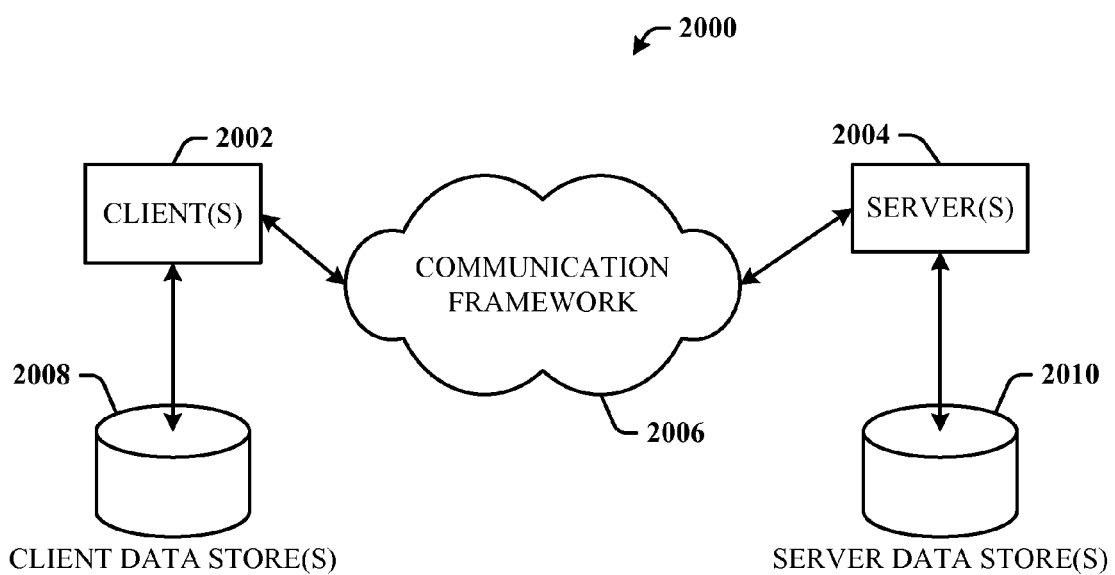
FIG. 20 illustrates a schematic block diagram of an exemplary computing environment in accordance with the subject invention.

Referring now to FIG. 20, there is illustrated a schematic block diagram of an exemplary computing environment 2000 in accordance with the subject invention. The system 2000 includes one or more client(s) 2002. The client(s) 2002 can be hardware and/or software (e.g., threads, processes, computing devices). The client(s) 2002 can house cookie(s) and/or associated contextual information by employing the invention, for example.

The system 2000 also includes one or more server(s) 2004. The server(s) 2004 can also be hardware and/or software (e.g., threads, processes, computing devices). The servers 2004 can house threads to perform transformations by employing the invention, for example. One possible communication between a client 2002 and a server 2004 can be in the form of a data packet adapted to be transmitted between two or more computer processes. The data packet may include a cookie and/or associated contextual information, for example. The system 2000 includes a communication framework 2006 (e.g., a global communication network such as the Internet) that can be employed to facilitate communications between the client(s) 2002 and the server(s) 2004.

Communications can be facilitated via a wired (including optical fiber) and/or wireless technology. The client(s) 2002 are operatively connected to one or more client data store(s) 2008 that can be employed to store information local to the client(s) 2002 (e.g., cookie(s) and/or associated contextual information). Similarly, the server(s) 2004 are operatively connected to one or more server data store(s) 2010 that can be employed to store information local to the servers 2004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An RFID (radio frequency identification)-based system, comprising:
   a controller configured to control an industrial process, further comprising:
   an internal controller communications framework configured to facilitate communications between components connected thereto; and
   an RFID reader configured to read RFID tag and communicate information read from the RFID tag to the controller, the RFID tag is externally located to the controller.

2. The system of claim 1, the RFID reader is further configured to interface with the internal controller communications framework.

3. The system of claim 1, wherein the RFID reader is also a writer.

4. The system of claim 1, wherein the internal controller communications framework is packet-based.

5. The system of claim 1, wherein configuration data of the RFID reader is stored in the controller.

6. The system of claim 1, wherein the read RFID information is stored in the controller.

7. The system of claim 1, wherein a task is initiated in response to the RFID reader reading an RFID tag.

8. The system of claim 1, wherein the internal controller communications framework is further configured to facilitate communications to a remote node of a network via a network interface.

9. The system of claim 1, further comprising a signal strength processing component configured to process signal strength values of RFID tags associated with a plurality of RFID readers.

10. The system of claim 1, wherein the controller further includes a bar code scanner configured to read bar code data of a bar code.

11. A method of providing an RFID-based industrial automation system, comprising:
    providing a controller that interacts with one or more aspects of an automation process;
    incorporating within the controller a controller communications framework facilitating transmission of data between components attached thereto;
    locating an RFID reader on the controller communications framework; and
    reading RFID tag information where the RFID tags are remotely located to the controller.

12. The method of claim 11, further comprising:
    forwarding, via the controller communications framework, the read RFID tag information for processing by the controller.

13. The method of claim 12, further comprising:
    receiving the read RFID tag information; and
    initiating a task based upon the received RFID tag information.

14. The method of claim 11, wherein the controller is a PLC.

15. The method of claim 11, further comprising automatically powering down the RFID reader after at least one of a predetermined number of read operations or a predetermined time duration.

16. The method of claim 11, further comprising configuring the RFID reader to have RFID tag writing capabilities.

17. The method of claim 16, further comprising employing the RFID reader/writer to update RFID tags associated with the controller.

18. An RFID (radio frequency identification)-based industrial control system, comprising:
- means for controlling an industrial process;
- means for incorporating an RFID reader within the means for controlling;
- means for reading RFID tag information from RFID tags associated with objects remotely located to the means for controlling;
- means for communicating the read RFID tag information; and
- means for processing the read RFID tag information.

19. The system of claim 18, further comprising:
- means for locating the means for controlling in a communication network.

20. The system of claim 19, further comprising:
- means for processing read RFID tag information received from RFID readers located remotely from the means for controlling.

* * * * *